(12) United States Patent
Takami et al.

(10) Patent No.: US 9,461,307 B2
(45) Date of Patent: Oct. 4, 2016

(54) POWER SUPPLY SYSTEM AND MOTOR CAR

(71) Applicant: KABUSHIKI KAISHA TOSHIBA, Tokyo (JP)

(72) Inventors: Norio Takami, Yokohama (JP); Hiroki Inagaki, Kawasaki (JP); Yoshinao Tatebayashi, Yokohama (JP); Yasuhiro Harada, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/994,842

(22) Filed: Jan. 13, 2016

(65) Prior Publication Data

US 2016/0126546 A1 May 5, 2016

Related U.S. Application Data

(63) Continuation of application No. 11/853,373, filed on Sep. 11, 2007, now abandoned.

(30) Foreign Application Priority Data

Sep. 15, 2006 (JP) ................................. 2006-251604

(51) Int. Cl.
*H01M 4/485* (2010.01)
*H01M 4/525* (2010.01)
*H01M 4/587* (2010.01)
*H01M 10/0525* (2010.01)
*H01M 10/42* (2006.01)
(Continued)

(52) U.S. Cl.
CPC ............ *H01M 4/485* (2013.01); *H01M 4/505* (2013.01); *H01M 4/525* (2013.01); *H01M 4/583* (2013.01); *H01M 4/587* (2013.01); *H01M 10/0525* (2013.01); *H01M 10/4207* (2013.01); *H01M 10/441* (2013.01); *H01M 2/10* (2013.01); *H01M 2220/10* (2013.01); *H01M 2220/20* (2013.01); *Y02E 60/122* (2013.01); *Y02T 10/7011* (2013.01)

(58) Field of Classification Search
None
See application file for complete search history.

(56) References Cited

U.S. PATENT DOCUMENTS 5,828,201 A 10/1998 Hoffman, Jr. et al.
7,811,707 B2 10/2010 Lampe-Onnerud et al.
(Continued)

FOREIGN PATENT DOCUMENTS

EP 1220349 A1 7/2002
EP 1 921 705 A2 5/2008
(Continued)

*Primary Examiner* — Sarah A Slifka
(74) *Attorney, Agent, or Firm* — Oblon, McClelland, Maier & Neustadt, L.L.P.

(57) ABSTRACT

A power supply system includes a first battery module and a second battery module. The first battery module comprises a first nonaqueous electrolyte battery comprising a negative electrode containing a carbonaceous material. The second battery module comprises a second nonaqueous electrolyte battery comprising a negative electrode and a positive electrode. The negative electrode contains a negative electrode active material that has a lithium ion absorbing potential of 0.4V (vs. Li/Li$^+$) or more and an average particle diameter of 1 μm or less. The positive electrode contains lithium metallic oxide represented by $Li_xCo_yM_{1-y}O_2$. The second battery module is chargeable in a range of 20 to 80% of charging depth so that a charging current density (A/kg) of the second nonaqueous electrolyte battery becomes higher that that of the first nonaqueous electrolyte battery.

13 Claims, 10 Drawing Sheets

(51) Int. Cl.
  *H01M 10/44* (2006.01)
  *H01M 4/505* (2010.01)
  *H01M 4/583* (2010.01)
  *H01M 2/10* (2006.01)

(56) References Cited

U.S. PATENT DOCUMENTS

2005/0130035 A1 6/2005 Inada et al.
2006/0068272 A1 3/2006 Takami et al.
2006/0197496 A1 9/2006 Iijima et al.
2006/0246356 A1 11/2006 Abe et al.
2008/0067972 A1 3/2008 Takami et al.

FOREIGN PATENT DOCUMENTS

| | | |
|---|---|---|
| JP | 11-144764 | 5/1999 |
| JP | 2000-348725 | 12/2000 |
| WO | 97/31401 | 8/1997 |
| WO | 99/28982 | 6/1999 |
| WO | 02/081255 A1 | 10/2002 |
| WO | 2005/015677 A1 | 2/2005 |

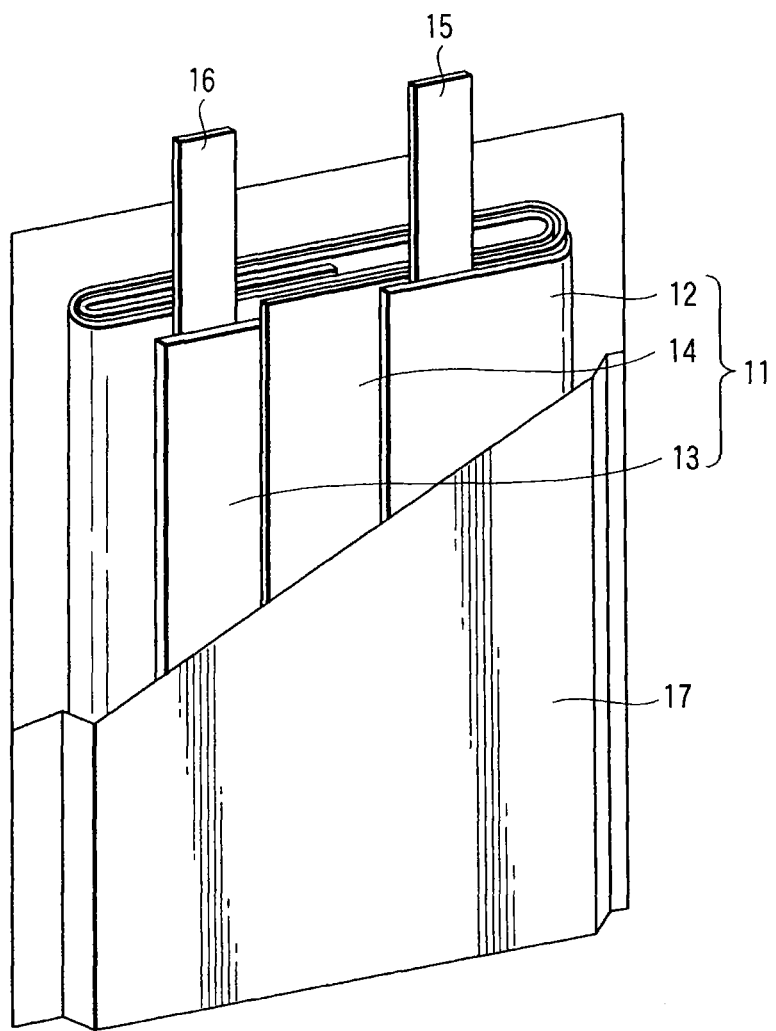
F I G. 3

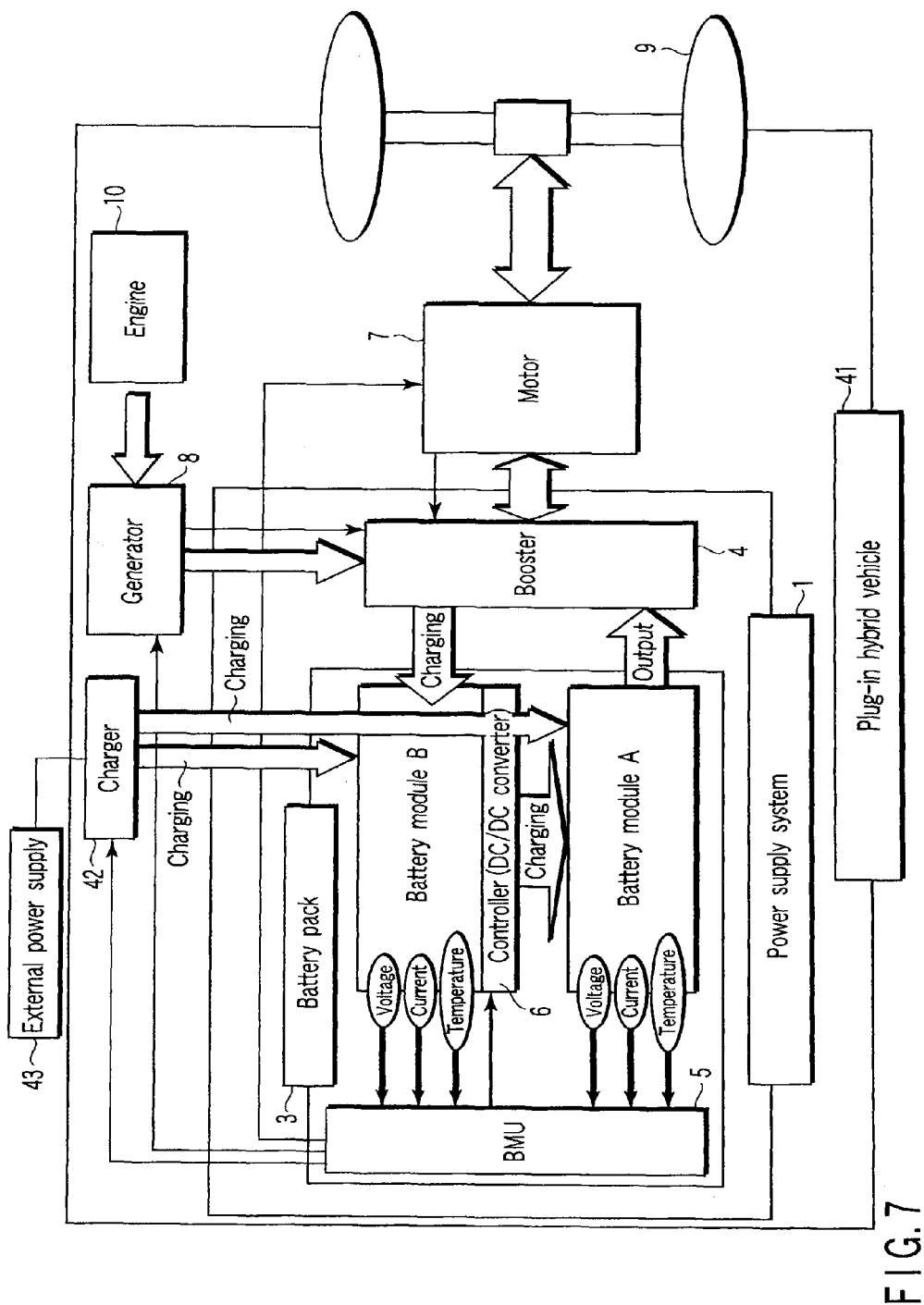
F I G. 7

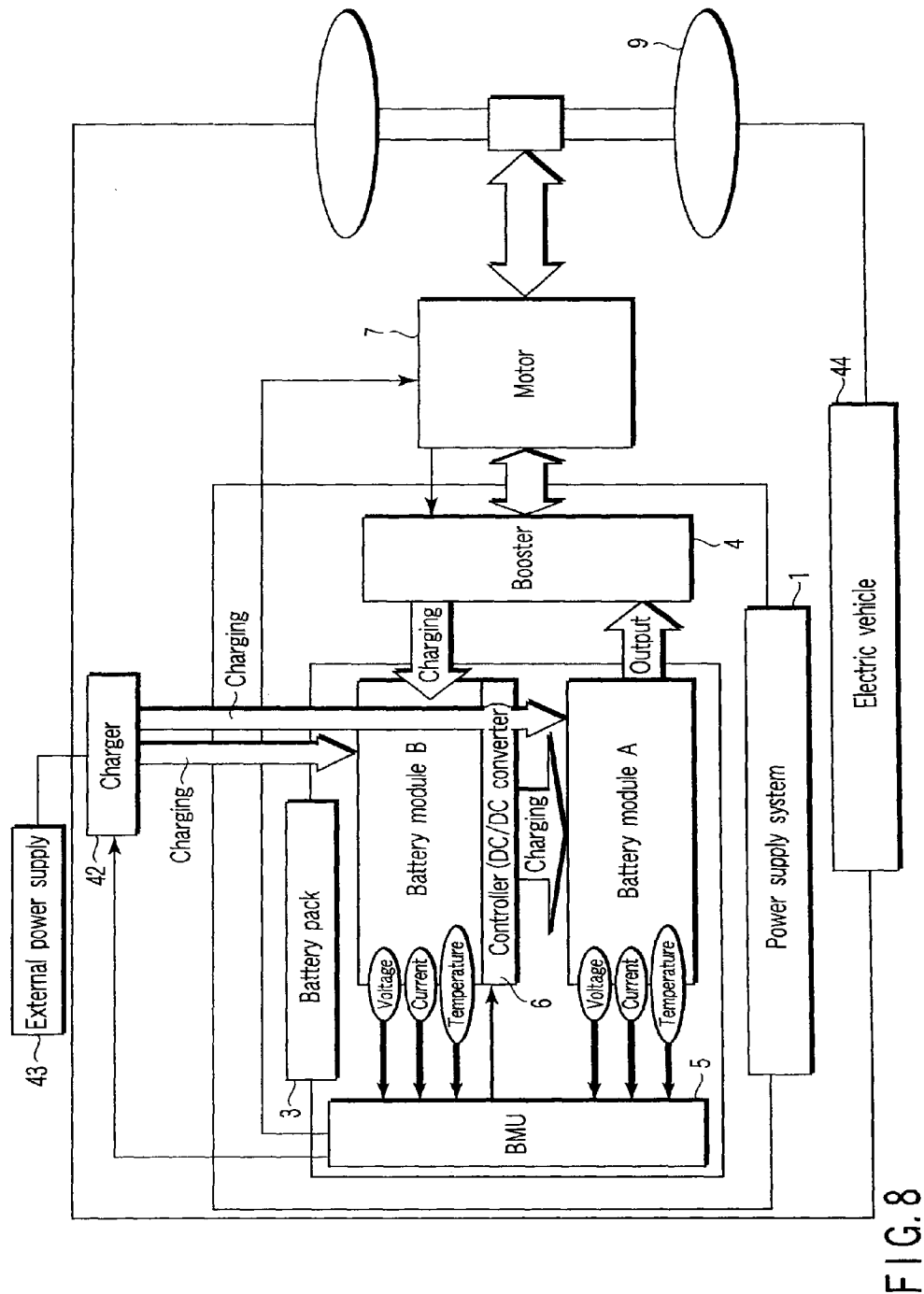
F I G. 8

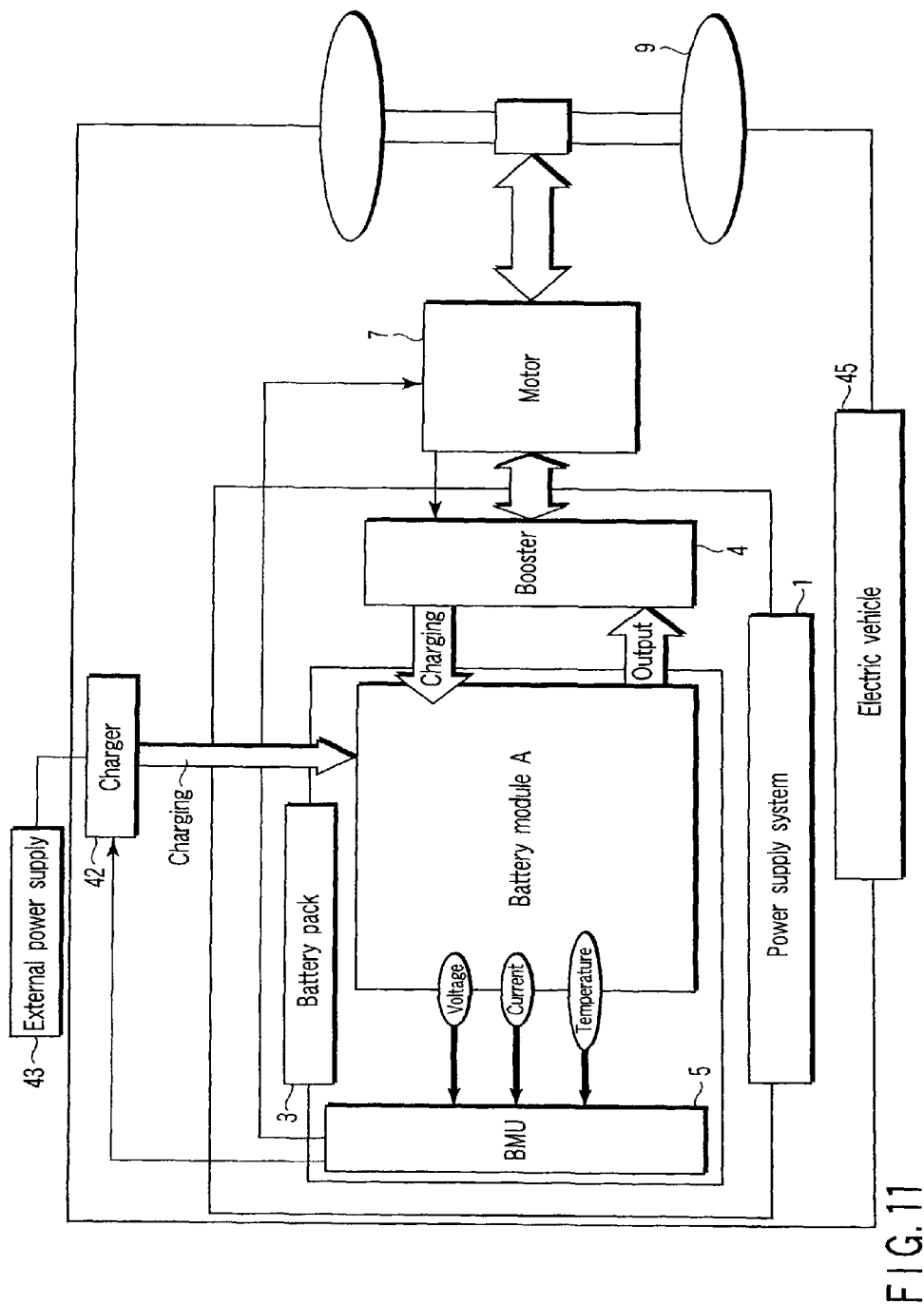
F I G. 11

POWER SUPPLY SYSTEM AND MOTOR CAR

CROSS-REFERENCE TO RELATED APPLICATIONS

This application is a continuation of U.S. application Ser. No. 11/853,373, filed Sep. 11, 2007, and is based upon and claims the benefit of priority from prior Japanese Patent Application No. 2006-251604, filed Sep. 15, 2006, the entire contents of each of which are incorporated herein by reference.

BACKGROUND OF THE INVENTION

1. Field of the Invention

The present invention relates to a power supply system provided with a nonaqueous electrolyte battery and a motor car provided with the power supply system.

2. Description of the Related Art

In recent years, vigorous research is being conducted on, for example, a hybrid vehicle, a motorcycle, an electric tram, an elevator and a windpower plant each having a battery mounted therein in order to utilize effectively the energy, and to utilize effectively the regenerative energy in view of the preservation of the earth's environment. Some of them have been in practical use. Also, secondary batteries have been studied as a backup power supply in case of emergency such as a power failure. Batteries that have been in practical use and mounted include a lead-acid storage battery and a nickel-hydrogen secondary battery.

However, for example, nickel-hydrogen secondary batteries used for hybrid vehicles have a problem that batteries suddenly produce heat during high power output or fast charging by regenerative energy, and also degradation by heat is severe. Also, lead-acid storage batteries used as an emergency power supply are subject to restrictions of installation locations because they are heavy due to small weight energy density.

On the other hand, hybrid vehicles using large-capacity capacitors have also been under development. However, while the capacitors can instantaneously store large electric power compared with the secondary batteries, there is a problem that the capacitors have a very small electric capacity and thus cannot be miniaturized.

In addition, for electric vehicles, a power supply system that can efficiently recover regenerative energy when a brake is applied has not yet been developed and thus, large-capacity batteries must be mounted.

Under such circumstances, high-power lithium-ion batteries have been developed to overcome the above problems. Lithium-ion batteries with high voltage and light weight have high energy density, but with the use of a carbonaceous material for a negative electrode, there is a problem of cycle life degradation caused, for example, by fast charging during energy regeneration or the like. Consequently, input power into the lithium-ion batteries must be limited and regenerative energy cannot be stored efficiently. Moreover, if output power of the lithium-ion batteries is made higher, discharge capacity will be decreased, making a travel distance of, for example, an electric vehicle (EV) or hybrid vehicle shorter. Also, for plug-in hybrid vehicles, making the travel distance by motor driving (EV running) longer will be demanded in addition to improvement of energy regeneration performance when a brake is applied and accelerating performance. However, it is difficult to have both improvement of energy regeneration performance and accelerating performance and improvement of traveling performance by motor driving (EV running) at the same time.

JP-A 2000-348725 (KOKAI) discloses that if carbon or lithium-titanium oxide is used as a negative electrode material, the potential changes little when the negative electrode is charged and thus an end point of charging must be determined by the positive electrode potential. As a result, fast charging performance will be deteriorated. Therefore, in JP-A 2000-348725 (KOKAI), an attempt is made to control the end point of charging through the negative electrode potential by forming a negative electrode active material from a carbonaceous material and a material (for example, lithium-titanium oxide) whose potential in a plateau area is higher than that of the carbonaceous material. In the plateau area, the potential does not change even if lithium is taken in.

However, lithium ion absorbing potential of the carbonaceous material is different from that of the lithium-titanium oxide. Therefore, if the carbonaceous material and the lithium-titanium oxide are used together in a cell, lithium ion absorbing/desorbing is unlikely to occur in the carbonaceous material, making it impossible to provide a high discharge capacity.

BRIEF SUMMARY OF THE INVENTION

An object of the present invention is to provide a power supply system superior in cycle performance in fast charging and a motor car provided with the power supply system.

According to an aspect of the present invention, there is provided a power supply system comprising:

a first battery module which supplies electric energy to an outside and comprises a first nonaqueous electrolyte battery comprising a positive electrode and a negative electrode containing a carbonaceous material; and a second battery module which supplies electric energy to the first battery module and comprises a second nonaqueous electrolyte battery comprising a negative electrode containing a negative electrode active material that has a lithium ion absorbing potential of 0.4V (vs. Li/Li$^+$) or more and an average particle diameter of 1 μm or less, and a positive electrode containing lithium metallic oxide represented by $Li_xCo_yM_{1-y}O_2$ (M is at least one element selected from the group consisting of Ni, Mn, Al and Sn, $0<x\leq1.1$, and $0\leq y<1$), and the second battery module is chargeable in a range of 20 to 80% of charging depth so that a charging current density (A/kg) of the second nonaqueous electrolyte battery becomes higher that that of the first nonaqueous electrolyte battery.

BRIEF DESCRIPTION OF THE SEVERAL VIEWS OF THE DRAWING

FIG. 3 is a partially cut-away perspective view schematically showing a flat nonaqueous electrolyte battery used in the battery module of FIG. 2;

FIG. 7 is a block diagram showing a power supply system and a motor car according to a second embodiment;

FIG. 8 is a block diagram showing a power supply system and a motor car according to a third embodiment;

FIG. 11 is a block diagram showing a power supply system and a motor car in Comparative Example 1.

DETAILED DESCRIPTION OF THE INVENTION

Figure 1:
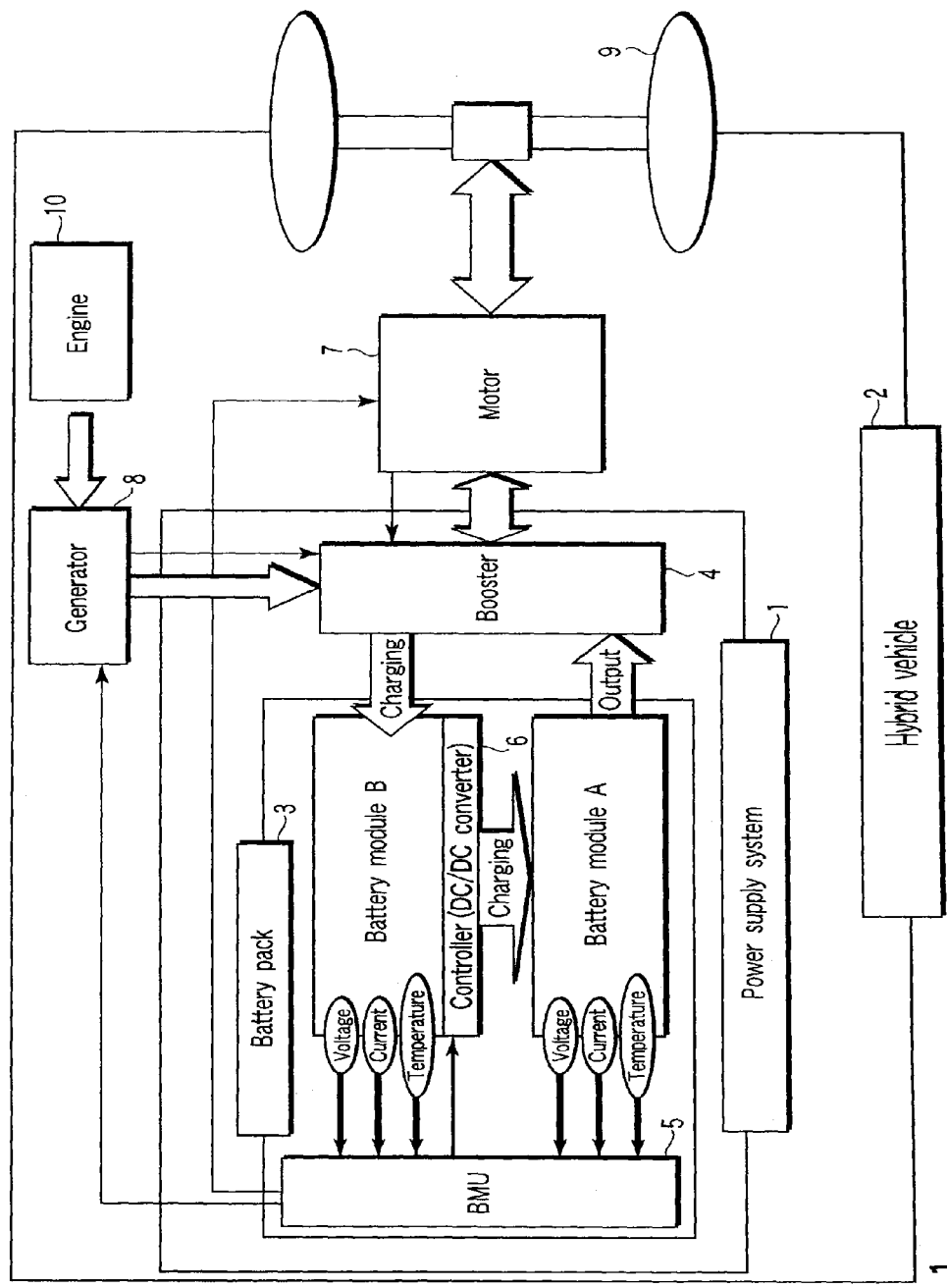
FIG. 1 is a block diagram showing a power supply system and a motor car according to a first embodiment.

By using two battery modules, a first battery module and a second battery module, a power supply system according to the present embodiment can efficiently be charged during fast charging such as regenerative charging and also discharge for a prolonged period when a motor car runs.

That is, the first battery module comprising a first non-aqueous electrolyte battery comprising a positive electrode and a negative electrode containing a carbonaceous material has a higher energy density than the second battery module. Therefore, by using the first battery module as an electric energy supply source outside the power supply system, a motor car can be driven for a long time.

In contrast, a negative electrode active material used in a second nonaqueous electrolyte battery constituting the second battery module has a lithium ion absorbing potential of 0.4V (vs. Li/Li$^+$) or higher, and thus can suppress deposition of lithium metal during fast charging such as regenerative charging. Also, the positive electrode potential early in charging can be made lower than that of lithium-cobalt complex oxide such as LiCoO$_2$ by using lithium metallic oxide represented by Li$_x$Co$_y$M$_{1-y}$O$_2$ (M is at least one element selected from the group consisting of Ni, Mn, Al, and Sn, 0<x≤1.1, and 0≤y<1). Therefore, it becomes highly unlikely that the positive electrode potential during fast charging such as regenerative charging reaches an overcharge area, so that positive electrode degradation caused by overcharging can be suppressed. By making the average particle diameter of a negative electrode active material equal to or less than 1 µm, the lithium ion absorbing/desorbing speed of the negative electrode active material can be increased.

Further, by charging the second battery module in the range of 20% or more and 80% or less of charging depth so that the charging current density (A/kg) of the second nonaqueous electrolyte battery becomes higher than that of the first nonaqueous electrolyte battery, charging efficiency during high input such as regenerative charging and fast charging can be enhanced. If the charging depth is lower than 20%, the second battery module is more likely to fall into an overdischarge state when the second battery module supplies electric energy to the first battery module, degrading cycle performance in fast charging. If the charging depth exceeds 80%, the discharge duration becomes shorter even though the first battery module is used because receiving performance of regenerative power by the second battery module degrades. Moreover, because the second battery module is more likely to fall into an overdischarge state, cycle performance in fast charging also degrades. A preferable range of the charging depth is 40% or more and 60% or less. The second battery module can receive electric energy from, for example, a motor, generator, or charger.

The charging depth is also called an SOC (state of charge) and is the ratio of a charged capacity of a cell to a fully-charged capacity. The nominal capacity of a cell is used as the fully-charged capacity.

The charging current density (A/kg) of the first nonaqueous electrolyte battery is a value obtained by dividing the maximum charging current value (A) of the first nonaqueous electrolyte battery by the weight (kg) of the first nonaqueous electrolyte battery. The charging current density (A/kg) of the second nonaqueous electrolyte battery is a value obtained by dividing the maximum charging current value (A) of the second nonaqueous electrolyte battery by the weight (kg) of the second nonaqueous electrolyte battery.

The first battery module is charged by receiving power from, for example, the second battery module or a charger. It is desirable that the charging depth of the first battery module is in the range of 40% or more and 100% or less. It is thereby made easier to control the charging depth of the second battery module in the range of 20% or more and 80% or less, so that input/output performance of the second battery module can be maintained at a high level. A more preferable range is 60% or more and 80% or less. The method of supplying electric energy from the second battery module to the first battery module is preferably a constant current and constant voltage charging method.

The first and second battery modules are provided with modules obtained by connecting a plurality of unit cells, which are either the first nonaqueous electrolyte battery or the second nonaqueous electrolyte battery, in series or in parallel. The first and second nonaqueous electrolyte batteries are each provided with a positive electrode, a negative electrode, and nonaqueous electrolyte. First, the second nonaqueous electrolyte battery will be described.

1) Negative Electrode

The negative electrode comprises a negative electrode current collector and a negative electrode layer coated on one side or both sides of the negative electrode current collector. The negative electrode layer contains a negative electrode active material, a conductive agent and a binder. The negative electrode active material has a lithium ion absorbing potential of 0.4V (vs. Li/Li$^+$) or more and an average particle diameter of 1 µm or less. The upper limit of the lithium ion absorbing potential can be set to 3V (vs. Li/Li$^+$).

The negative electrode active material is preferably metallic oxide, metallic sulfide, metallic nitride, or an alloy.

Examples of the metallic oxide include tungsten oxide (WO$_3$), amorphous tin oxide, tin silicon oxide (SnSiO$_3$), silicon oxide (SiO), titanium-containing oxide, and lithium-titanium oxide. Examples of the titanium-containing oxide include TiO$_2$ and metallic complex oxide containing Ti and at least one element selected from the group consisting of P, V, Sn, Cu, Ni, and Fe. TiO$_2$ is preferably of anatase type and low in crystallizability caused by a heat treating temperature of 300 to 500° C. Examples of the metallic complex oxide containing Ti and at least one element selected from the group consisting of P, V, Sn, Cu, Ni, and Fe include TiO$_2$—P$_2$O$_5$, TiO$_2$—V$_2$O$_5$, TiO$_2$—P$_2$O$_5$—SnO$_2$, and TiO$_2$—P$_2$O$_5$-MeO (Me is at least one element selected from the group consisting of Cu, Ni, and Fe). It is desirable that this metallic complex oxide is low in crystallizability and has a microstructure in which a crystalline phase and amorphous phase coexist or an amorphous phase alone exists. With such a microstructure, cycle performance can be improved remarkably.

Examples of the metallic sulfide include lithium sulfide ($TiS_2$), molybdenum sulfide ($MoS_2$), and iron sulfide ($FeS$, $FeS_2$, $Li_xFeS_2$).

Examples of the metallic nitride include lithium-cobalt nitride ($Li_xCo_yN$, $0<x<4$, $0<y<0.5$).

Examples of the lithium alloy include a lithium-aluminum alloy, lithium-zinc alloy, lithium-magnesium alloy, lithium-silicon alloy, and lithium-lead alloy.

Particularly, the negative electrode active material containing lithium-titanium oxide is preferable. Examples of the lithium-titanium oxide include a lithium titanate having a spinel structure (a spinel type lithium titanate) and a lithium titanate having a rhamsdelite structure (a rhamsdelite-type lithium titanate). Examples of the spinel type lithium titanate include $Li_{4+x}Ti_5O_{12}$, x is $-1 \leq x \leq 3$, preferably $0 \leq x \leq 1$. Examples of the rhamsdelite-type lithium titanate include $Li_{2+y}Ti_3O_7$ (y is $-1 \leq y \leq 3$). Particularly, spinel type lithium titanate is preferable in terms of cycle performance. This is because spinel type lithium titanate is resistant to nonaqueous electrolyte decomposition and the volume of the negative electrode changes little even if the average particle diameter is made equal to or less than 1 µm, resulting in an excellent long-term cycle life performance in fast charging.

A more preferable range of the average particle diameter of the negative electrode active material is 0.3 µm or less. However, if the average particle diameter is small, aggregation of particles is more likely to occur and degradation of homogeneity of the negative electrode may be caused. Therefore, it is desirable to set the lower limit to 0.001 µm.

It is desirable to prepare powder whose average particle diameter is 1 µm or less as an active material precursor through synthesis of active raw materials. A negative electrode active material whose average particle diameter is 1 µm or less is obtained by performing a grinding process of the powder after burning treatment using a ball mill or jet mill to 1 µm or less.

The average particle diameter of the negative electrode active material is measured as follows.

Specifically, about 0.1 g of a sample, a surfactant, and 1 to 2 mL of a distilled water are put in a beaker, and the distilled water is sufficiently stirred, followed by pouring the stirred system in a stirring water vessel. Under this condition, the light intensity distribution is measured every 2 seconds and measured 64 times in total by using SALD-300, which is a Laser Diffraction Particle Size Analyzer manufactured by Shimadzu Corporation, to analyze the particle size distribution data.

The negative electrode current collector is preferably formed from aluminum foil or aluminum alloy foil. The average crystal grain size of the aluminum foil or aluminum alloy foil is preferably 50 µm or less. A more preferable average crystal grain size is 10 µm or less. Although chemical and physical strength of the negative electrode current collector increases as the average crystal grain size becomes smaller, it is desirable that the microscopic structure is crystalline to have excellent conductivity. Therefore, the lower limit of the average crystal grain size is preferably set to 0.01 µm.

By setting the average crystal grain size to 50 µm or less, strength of the aluminum foil or aluminum alloy foil can dramatically be increased. With the increase in strength of the negative electrode current collector, physical and chemical stability can be improved to minimize a rupture of the negative electrode current collector. Particularly, degradation due to dissolution/deterioration of the negative electrode current collector, which is noticeable in an overdischarge cycle in the high temperature environment of 40° C. or more, can be prevented, and an increase in electrode resistance can be suppressed. Further, Joule heat is reduced by suppressing the increase in electrode resistance and therefore, heat generation in the electrode can be suppressed.

Also, with the increase in strength of the negative electrode current collector, the current collector will not break even if a high pressing pressure is applied to the negative electrode. Accordingly, the negative electrode can be made dense, improving capacity density.

When pressing the electrode, load on the negative electrode current collector generally increases as the average particle diameter of the negative electrode active material becomes smaller. By using aluminum foil whose average crystal grain size is 50 µm or less or aluminum alloy foil whose average crystal grain size is 50 µm or less as the negative electrode current collector, the negative electrode current collector will be able to withstand heavy load caused by the negative electrode active material, whose average particle diameter is 1 µm or less, when the electrode is pressed. Therefore, a rupture of the negative electrode current collector when pressed can be avoided.

In addition, with higher density of the negative electrode, thermal conductivity increases so that heat release properties of the electrode can be improved. Further, due to a synergistic effect of suppression of heat generation of the battery and improvement of heat release properties of the electrode, it becomes possible to control the rise of battery temperature.

Aluminum foil or aluminum alloy foil having an average crystal grain size in a range of 50 µm or less varies depending on many factors such as material composition, impurities, processing condition, heating condition, annealing condition and cooling condition, and the average crystal grain size can be adjusted by factors in the manufacturing process. As aluminum foil of the negative electrode current collector, aluminum foil PACAL21 (tradename of Japan Foil) can be used.

More specifically, an aluminum foil having an average crystal grain size of 50 µm or less can be manufactured by annealing an aluminum foil having an average crystal grain size of 90 µm at 50 to 250° C., and quenching to room temperature. On the other hand, an aluminum alloy foil having an average crystal grain size of 50 µm or less can be manufactured by annealing an aluminum alloy foil having an average crystal grain size of 90 µm at 50 to 250° C., and quenching to room temperature.

The average crystal grain size of aluminum and aluminum alloy is measured by the following method. Textures of a surface of the negative electrode current collector are observed by a metallographic microscope, the number of crystal grains existing within a viewing field of 1 mm×1 mm is counted, and the average crystal grain area S (µm$^2$) is calculated by formula (2).

$$S = (1 \times 10^6)/n \quad (2)$$

where ($1 \times 10^6$) is viewing field area (µm$^2$) of 1 mm×1 mm, and n is the number of crystal grains.

Using the obtained average crystal grain area S, the average crystal grain diameter d (µm) is calculated by formula (3). The average crystal grain diameter d was calculated in five positions (five viewing fields), and the average was obtained as the average crystal grain size. An assumed error is about 5%.

$$d = 2(S/\pi)^{1/2} \quad (3)$$

The thickness of the negative electrode current collector is preferred to be 20 μm or less. Purity of aluminum for use in the negative electrode current collector is preferred to be 99.99% or higher. An aluminum alloy is preferably an alloy containing aluminum and at least one element selected from the group consisting of magnesium, zinc, manganese, and silicon. On the other hand, it is desirable for the amount of the transition metals such as iron, copper, nickel and chromium, which are contained in the aluminum alloy, to be no larger than 100 ppm.

A carbonaceous material can be used as a conductive agent. Examples of the conductive agent include acetylene black, carbon black, coke, carbon fiber, and graphite.

Examples of the binder include polytetrafluoroethylene (PTFE), polyvinylidene fluoride (PVdF), fluorine-based rubber, and styrene-butadiene rubber.

It is preferable to set the compounding ratio of the negative electrode active material, conductive agent, and binder to 80 to 95% by weight for negative electrode active material, 3 to 18% by weight for conductive agent, and 2 to 7% by weight for binder.

The negative electrode is manufactured, for example, by suspending a negative electrode active material, conductive agent, and binder in a suitable solvent, and applying the resultant suspension to a negative electrode current collector, followed by drying and pressing. It is preferable that the thickness of the negative electrode layer per side of the negative electrode current collector is 5 to 100 μm. Particularly, the range of 5 to 50 μm is preferable because thermal conductivity is high when charging/discharging a large current so that sudden heat generation can be suppressed.

2) Positive Electrode

The positive electrode comprises a positive electrode current collector and a positive electrode layer coated on one side or both sides of the positive electrode current collector and containing a positive electrode active material, a conductive agent, and a binder.

A material superior in fast charging performance is used as the positive electrode active material. Specific examples of the positive electrode active material include lithium metallic oxide represented by $Li_xCo_yM_{1-y}O_2$ (M is at least one element selected from the group consisting of Ni, Mn, Al, and Sn, $0<x\leq 1.1$, and $0<y<1$). By using this positive electrode active material, it becomes possible to reduce positive electrode resistance components and lower the positive electrode potential at the time of charging and thus, the charging speed can be increased. A more preferable positive electrode active material is $Li_xCo_yNi_zMn_{1-y-z}O_2$ (where $0<x\leq 1.1$, $0.1\leq y\leq 0.6$, and $0.1\leq z\leq 0.8$). By using this positive electrode active material, fast charging performance is dramatically improved and regeneration performance are markedly improved.

Also by using lithium metallic oxide having a composition satisfying y=0, that is, lithium metallic oxide represented by $Li_xMO_2$ (M is at least one element selected from the group consisting of Ni, Mn, Al, and Sn, $0<x\leq 1.1$) instead of the lithium metallic oxide having the above composition, charging efficiency and cycle performance in fast charging can be improved.

Further, a positive electrode active material containing lithium metallic oxide represented by $Li_xCo_yM_{1-y}O_2$ (M is at least one element selected from the group consisting of Ni, Mn, Al, and Sn, $0<x\leq 1.1$, and $0\leq y<1$) and second lithium metallic oxide consisting of at least one selected from the group consisting of a lithium-manganese complex oxide having a spinel structure (a spinel type lithium-manganese complex oxide), a lithium-manganese-nickel complex oxide having a spinel structure (a spinel type lithium-manganese-nickel complex oxide) and a lithium metal phosphate having an olivine structure can also be used. By using such a positive electrode active material, charging efficiency and cycle performance in fast charging can be improved. Examples of the spinel type lithium-manganese complex oxide include $Li_aMn_2O_4$ ($0\leq a\leq 1$). Examples of the spinel type lithium-manganese-nickel complex oxide include $Li_aMn_{2-b}Ni_bO_4$ ($0\leq a\leq 1$, $0.1\leq b\leq 0.6$). Examples of the lithium metal phosphate having an olivine structure include $Li_cFePO_4$ ($0\leq c\leq 1$), $Li_dFe_{1-e}Mn_ePO_4$ ($0\leq d\leq 1$, and $Li_fCoPO_4$ ($0\leq f\leq 1$).

By using the spinel type lithium-manganese complex oxide or the spinel type lithium-manganese-nickel complex oxide as the second lithium metallic oxide, the positive electrode potential is raised and thus, output power after fast charging can still be improved. Also, by using lithium metal phosphate having an olivine structure as the second lithium metallic oxide, thermal stability of the positive electrode is improved and thus, cycle performance after fast charging can still be improved. To gain these effects, it is preferable that the ratio of the second lithium metallic oxide in the positive electrode active material is 50% by weight or less. A more preferable range is 10 to 50% by weight. A most preferable range is 10 to 40% by weight.

The average particle diameter of the positive electrode active material is preferably 3 μm or more. Reaction with nonaqueous electrolyte at a high temperature can thereby be suppressed so that degradation due to an increase in resistance of battery when driven or stored in the high temperature environment of 40° C. or more can dramatically be improved. A more preferable range is 3 μm or more and 6 μm or less.

The positive electrode current collector includes an aluminum foil or an aluminum alloy foil. The average crystal grain size of aluminum foil or aluminum alloy foil is 50 μm or less. More preferably, it is 10 μm or less. As a result, the strength of the positive electrode current collector is increased, and the positive electrode is increased in density without breaking down the positive electrode current collector, so that the energy density can be enhanced. The smaller the average crystal gain size, the less is the occurrence of pin holes and cracks, and at the same time, the chemical strength and physical strength of the positive electrode current collector can be enhanced. In order to assure an appropriate hardness by using the current collector having a crystalline fine texture, the lower limit of the average crystal grain size is preferred to be 0.01 μm.

The thickness of the positive electrode current collector is preferred to be 20 μm or less.

Examples of the conductive agent include acetylene black, carbon black, and graphite.

Examples of the binder include polytetrafluoroethylene (PTFE), polyvinylidene fluoride (PVdF), and fluorine-based rubber.

The compounding ratio of the positive electrode active material, conductive agent, and binder is preferably 80 to 95% by weight for positive electrode active material, 3 to 18% by weight for conductive agent, and 2 to 7% by weight for binder.

The positive electrode is manufactured, for example, by suspending a positive electrode active material, conductive agent, and binder in a suitable solvent, and applying the resultant suspension to a positive electrode current collector, followed by drying and pressing. The thickness of the positive electrode layer per side of the positive electrode current collector is preferably 5 to 250 p.m. Particularly, the range of 5 to 200 µm is preferable because thermal conductivity is high when charging/discharging a large current so that sudden heat generation can be suppressed.

3) Nonaqueous Electrolyte

Examples of the nonaqueous electrolyte include a liquid nonaqueous electrolyte prepared by dissolving an electrolyte in an organic solvent, a gel-like nonaqueous electrolyte in which the liquid nonaqueous electrolyte and polymeric material are combined, and a solid nonaqueous electrolyte in which a lithium salt electrolyte and polymeric material are combined. Alternatively, an ionic liquid containing lithium ions may be used.

The liquid nonaqueous electrolyte is prepared by dissolving an electrolyte in an organic solvent in concentration of 0.5 to 2 mol/L.

Examples of the electrolyte include $LiClO_4$, $LiPF_6$, $LiBF_4$, $LiAsF_6$, $LiCF_3SO_3$, $LiN(CF_3SO_2)_2$, $LiN(C_2F_5SO_2)_2$, $Li(CF_3SO_2)_3C$, and $LiB[(OCO)_2]_2$. One or two or more kinds of electrolytes may be used.

Examples of the organic solvent include cyclic carbonate such as propylene carbonate (PC) and ethylene carbonate (EC), chain carbonate such as diethyl carbonate (DEC), dimethyl carbonate (DMC), and methyl ethyl carbonate (MEC), chain ether such as dimethoxy ethane (DME) and diethoxy ethane (DEE), cyclic ether such as tetrahydrofuran (THF) and dioxolane (DOX), γ-butyrolactone (GBL), acetonitrile (AN), and sulfolane. A single or mixed solvent may be used. By using a nonaqueous electrolyte containing GBL, the amount of the gas generated in the stage of charging can still be reduced. It is still better to contain at least one selected from the group consisting of PC and EC, in addition to GBL.

Examples of the polymeric material include polyvinylidene fluoride (PVdF), polyacrylonitrile (PAN), and polyethylene oxide (PEO).

The ionic liquid is composed of lithium ions, organic cations, and organic anions, and is liquid at 100° C. or less, preferably at room temperature or less.

A separator can be arranged between the positive electrode and the negative electrode. Examples of the separator include a synthetic resin non-woven fabric, polyethylene porous film, and polypropylene porous film.

The positive electrode, negative electrode, and nonaqueous electrolyte are housed in a container. A laminate film container or a metallic container can be used as the container. The container may have a flat, rectangular, cylindrical, coin, button, sheet, or laminated shape. Also, the container may have a large size for an electric vehicle.

Examples of the laminate film include a multilayer film containing a metallic layer and a resin layer coating the metallic layer. The metallic layer is preferably aluminum foil or aluminum alloy foil to reduce weight. The resin layer is intended to reinforce the metallic layer and can be formed from polymers such as polypropylene (PP), polyethylene (PE), nylon, and polyethylene terephthalate (PET).

The laminate film container can be obtained by bonding the periphery of superposed laminate films by the heat sealing.

A preferable range of the thickness of the laminate film is 0.5 mm or less. It is also desirable to set the lower limit of the thickness of the laminate film to 0.01 mm.

The metal container is preferred to be formed of aluminum or aluminum alloy. An average crystal grain size of aluminum or aluminum alloy is preferred to be 50 µm or less. By controlling the average crystal grain size to 50 µm or less, the strength of the metal container made of aluminum or aluminum alloy is increased, and a sufficient mechanical strength can be assured if the wall thickness of the container is reduced. As a result, the heat releasing performance of the container is improved, and temperature rise of battery can be suppressed. By increased energy density, the battery can be reduced in weight and size. More preferably, it is 10 µm or less. The smaller the average crystal grain size, the higher becomes the chemical and physical strength of the container. However, since fine textures are preferred to be crystalline in order to obtain an excellent conductivity, the lower limit of the average crystal grain size is preferred to be 0.01 µm.

These features are preferred in a battery, such as a vehicle-mounted secondary battery, where high temperature conditions are present and high energy density are demanded.

A preferable range of the thickness of the metallic container is 0.5 mm or less. It is also desirable to set the lower limit of the thickness of the metallic container to 0.05 mm.

The aluminum foil preferably has a purity of 99.99% or more. It is preferable that the aluminum alloy contains elements such as magnesium, zinc, and silicon. On the other hand, it is preferable to reduce transition metals such as iron, copper, nickel, and chromium to 100 ppm or less.

The metallic container can be sealed by a laser. Thus, the volume of a sealing part can be reduced compared with the laminate film container so that energy density can be improved.

Next, the first nonaqueous electrolyte battery will be described. In the first nonaqueous electrolyte battery, the same structure as that of the second nonaqueous electrolyte battery can be used except that a positive electrode and a negative electrode described below are used.

(Negative Electrode)

The negative electrode comprises a negative electrode current collector and a negative electrode layer coated on one side or both sides of the negative electrode current collector and containing a negative electrode active material, a conductive agent, and a binder.

A carbonaceous material that absorbes/desorbes lithium ions is used as the negative electrode active material. Examples of the carbonaceous material include natural graphite, artificial graphite, coke, vapor-grown-carbon fiber, mesophase pitch based carbon fiber, mesophase globules, and resin baked carbon. More preferable carbonaceous materials are natural graphite, artificial graphite, mesophase pitch based carbon fiber, and mesophase globules. Average layer spacing derived from (002) reflection $d_{002}$ of the carbonaceous material by X-ray diffraction is preferably 0.340 nm or less. Energy density of the first battery module can thereby be improved and thus, discharge duration of the power supply system can be made longer. Further preferable carbonaceous material is a graphitized material whose $d_{002}$ is 0.337 nm or less and particularly preferable is obtained from a natural graphite. By using the graphitized material whose $d_{002}$ is 0.337 nm or less as the carbonaceous material and the same positive electrode active material as that of the second battery module, energy density can be improved and discharge duration can be made still longer. Since, at the same time, the discharge curve of the first nonaqueous electrolyte battery will align with that of the second nonaqueous electrolyte battery, it becomes easier to control charging depth of battery modules and to manage a remaining amount of the battery modules. Further, since the first battery module and second battery module can be controlled by a common charge/discharge control circuit, the cost and size of the power supply system can be reduced.

The shape of the carbonaceous material is preferably scaly, particulate, or spherical.

It is desirable that the negative electrode current collector is formed from copper foil. The negative electrode current collector preferably has a thickness of 20 μm or less.

A carbon material can be used as a conductive agent constituting the negative electrode. Examples of the conductive agent include acetylene black, carbon black, coke, carbon fiber, and graphite.

Examples of the binder include polytetrafluoroethylene (PTFE), polyvinylidene fluoride (PVdF), fluorine-based rubber, and styrene-butadiene rubber.

The compounding ratio of the negative electrode active material, conductive agent, and binder is preferably 80 to 100% by weight for negative electrode active material, 3 to 18% by weight for conductive agent, and 2 to 7% by weight for binder.

The negative electrode is manufactured, for example, by suspending a negative electrode active material, conductive agent, and binder in a suitable solvent, and applying the resultant suspension to a negative electrode current collector, followed by drying and pressing.

The thickness of the negative electrode layer per side of the negative electrode current collector is preferably 30 to 250 μm. Particularly, if the thickness is in the range of 50 to 200 μm, high capacity can be extracted during low-load discharging.

(Positive Electrode)

The same positive electrode as that described in the second nonaqueous electrolyte battery can be used for the positive electrode, but a positive electrode active material described below can also be used.

Examples of the positive electrode active material include oxide, sulfide, and polymers.

Examples of the oxide include manganese dioxide such as $MnO_2$, iron oxide, copper oxide, nickel oxide, lithium-manganese complex oxide such as $Li_xMn_2O_4$ and $Li_xMnO_2$, lithium-nickel complex oxide such as $Li_xNiO_2$, lithium-cobalt complex oxide such as $Li_xCoO_2$, lithium-nickel-cobalt complex oxide such as $LiNi_{1-y}Co_yO_2$, lithium-manganese-cobalt complex oxide such as $LiMn_yCo_{1-y}O_2$, spinel type lithium-manganese-nickel complex oxide such as $Li_xMn_{2-y}Ni_yO_4$, lithium metal phosphates having an olivine structure such as $Li_xFePO_4$, $Li_xFe_{1-y}Mn_yPO_4$, and $Li_xCoPO_4$, iron sulfate such as $Fe_2(SO_4)_3$, and vanadium oxide such as $V_2O_5$. Unless otherwise specified, x and y are preferably in the range of 0 to 1.

Examples of the polymers include a conductive polymer material such as polyaniline and polypyrrole, and a disulfide-based polymer material. In addition, sulfur (S) and carbon fluoride can also be used.

Preferable examples of the positive electrode active material include lithium-manganese complex oxide, lithium-nickel complex oxide, lithium-cobalt complex oxide, lithium-nickel-cobalt complex oxide, spinel type lithium-manganese-nickel complex oxide, lithium-manganese-cobalt complex oxide, and lithium iron phosphate. These positive electrode active materials provide a high positive electrode voltage. Among others, lithium-manganese complex oxide, lithium-nickel complex oxide, lithium-cobalt complex oxide, lithium-nickel-cobalt complex oxide, and lithium-manganese-cobalt complex oxide can suppress reaction with a nonaqueous electrolyte in a high temperature environment so that cycle life can dramatically be extended.

The use of lithium-nickel-cobalt-manganese complex oxide represented by $Li_aNi_bCo_cMn_dO_2$ (where the molar ratios a, b, c, and d satisfy $0 \leq a \leq 1.1$ and $b+c+d=1$) is also preferable. By using the lithium-nickel-cobalt-manganese complex oxide, a high battery voltage can be obtained. More preferable ranges of the molar ratios a, b, c, and d are: $0 \leq a \leq 1.1$, $0.1 \leq b \leq 0.5$, $0 \leq c \leq 0.9$, and $0.1 \leq d \leq 0.5$.

A power supply system according to the present embodiment is mounted in motor cars such as electric vehicles, hybrid vehicles, plug-in hybrid vehicles, two-wheeled motor vehicles, and electric railcars. First to third embodiments of hybrid vehicles, plug-in hybrid vehicles, and electric vehicles in which a power supply system is mounted will be described with reference to the drawings.

First Embodiment

FIG. 1 shows a block diagram of a hybrid vehicle 2 in which a power supply system 1 according to the present embodiment is mounted.

The power supply system 1 includes a battery pack 3 and a booster 4. The battery pack 3 includes a first battery module (battery module A), a second battery module (battery module B), and a battery management unit (BMU) 5. The battery module A and the battery module B are connected in parallel via a controller 6. The controller 6 is equipped with a DC/DC converter and, upon receipt of a signal from a charge/discharge control circuit 26 shown in FIG. 4, plays a role of controlling current/voltage characteristics of the battery module B to charge the battery module A with the battery module B. It is desirable to charge the battery module A by the battery module B by the constant current/constant voltage charging method. The battery modules A and B are each connected to the booster 4. The booster 4 is used to boost the voltage value of input electric energy to a preset value before outputting it.

A motor 7 and a generator 8 of the hybrid vehicle 2 are coupled to the booster 4. The motor 7 is used to drive a wheel 9. The generator 8 is coupled to an engine 10. The charge/discharge control circuit 26 of the BMU 5 of the power supply system 1 is connected to the generator 8 and the motor 7.

The battery modules A and B are provided with modules obtained by connecting a plurality of unit cells, which are either the first nonaqueous electrolyte battery or the second nonaqueous electrolyte battery, in series or in parallel. The battery modules A and B can each be housed in a cabinet while integrated with the BMU 5, as shown in, for example, FIG. 2.

A unit cell 21 consists of the first nonaqueous electrolyte battery or the second nonaqueous electrolyte battery and has a flat structure shown, for example, in FIG. 3. As shown FIG. 3, an electrode group 11 has a structure in which a positive electrode 12 and a negative electrode 13, with a separator 14 disposed therebetween, are wound in a flat spiral form. The electrode group 11 is produced, for example, by performing hot-press work after the positive electrode 12 and the negative electrode 13 with the separator 14 disposed therebetween are wound in a flat spiral form. The positive electrode 12, the negative electrode 13, and the separator 14 in the electrode group 11 may also be integrated by polymers having adhesive properties. A band-like positive electrode terminal 15 is electrically connected to the positive electrode 12. A band-like negative electrode terminal 16, on the other hand, is electrically connected to the negative electrode 13. The electrode group 11 is housed in a laminate film container 17 while an end of the positive electrode terminal 15 and that of the negative electrode terminal 16 are projected from the container 17. Incidentally, the laminate film container 17 is sealed by heat sealing.

The unit cell 21 preferably has a rated capacity of 2 Ah or more and 100 Ah or less. A more preferable range of the rated capacity is 3 Ah or more and 40 Ah or less. Here, the rated capacity means a capacity when discharged at a 0.2 C rate.

The preferable number of the unit cells 21 is 5 or more and 500 or less. The more preferable number of the unit cells 21 is 5 or more and 200 or less. For vehicle-mounted unit cells, the unit cells 21 are preferably connected in series to gain a high voltage.

Figure 2:
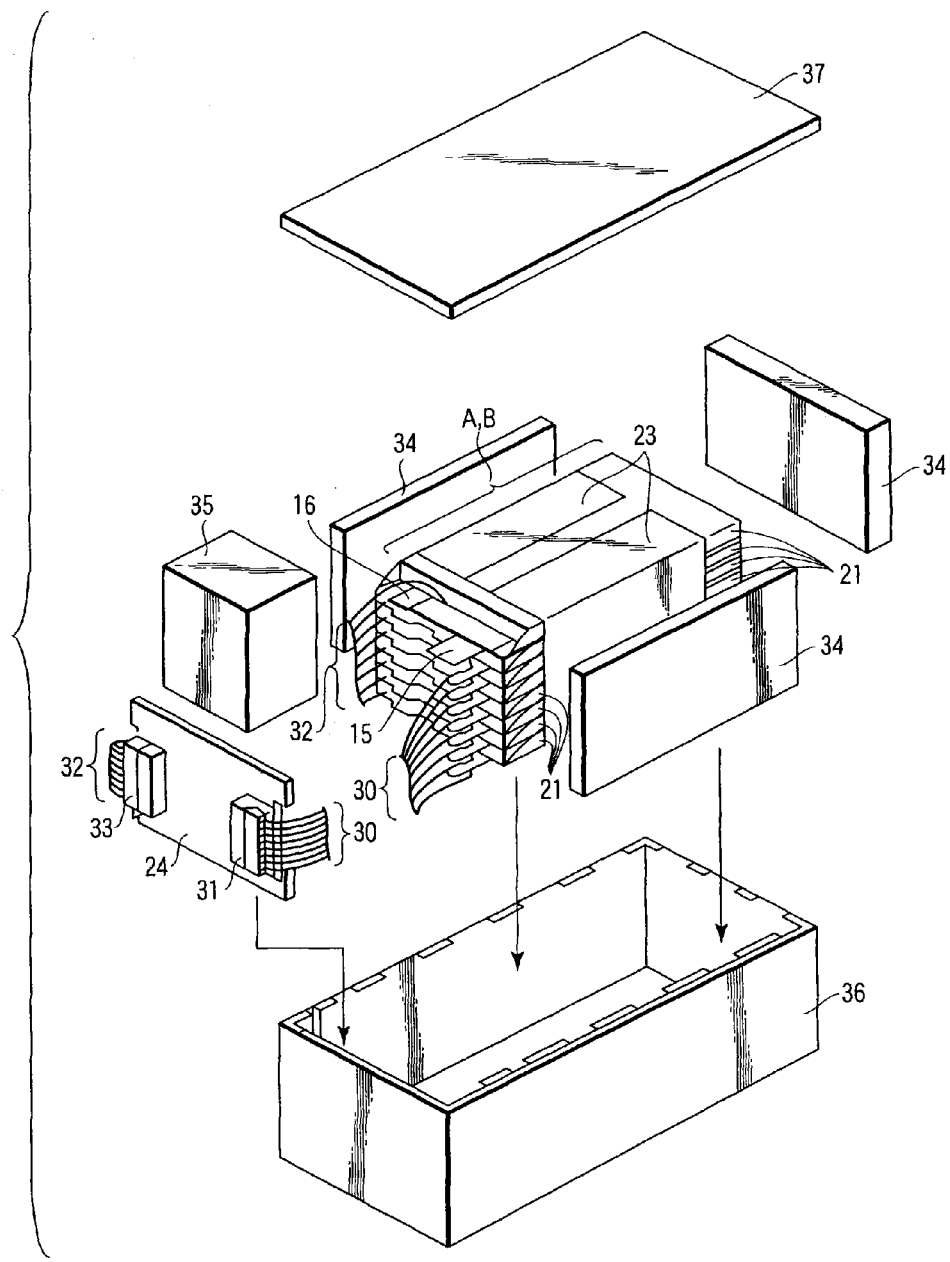
FIG. 2 is an exploded perspective view of a BMU integrated battery module used in the power supply system of FIG. 1.
Figure 4:
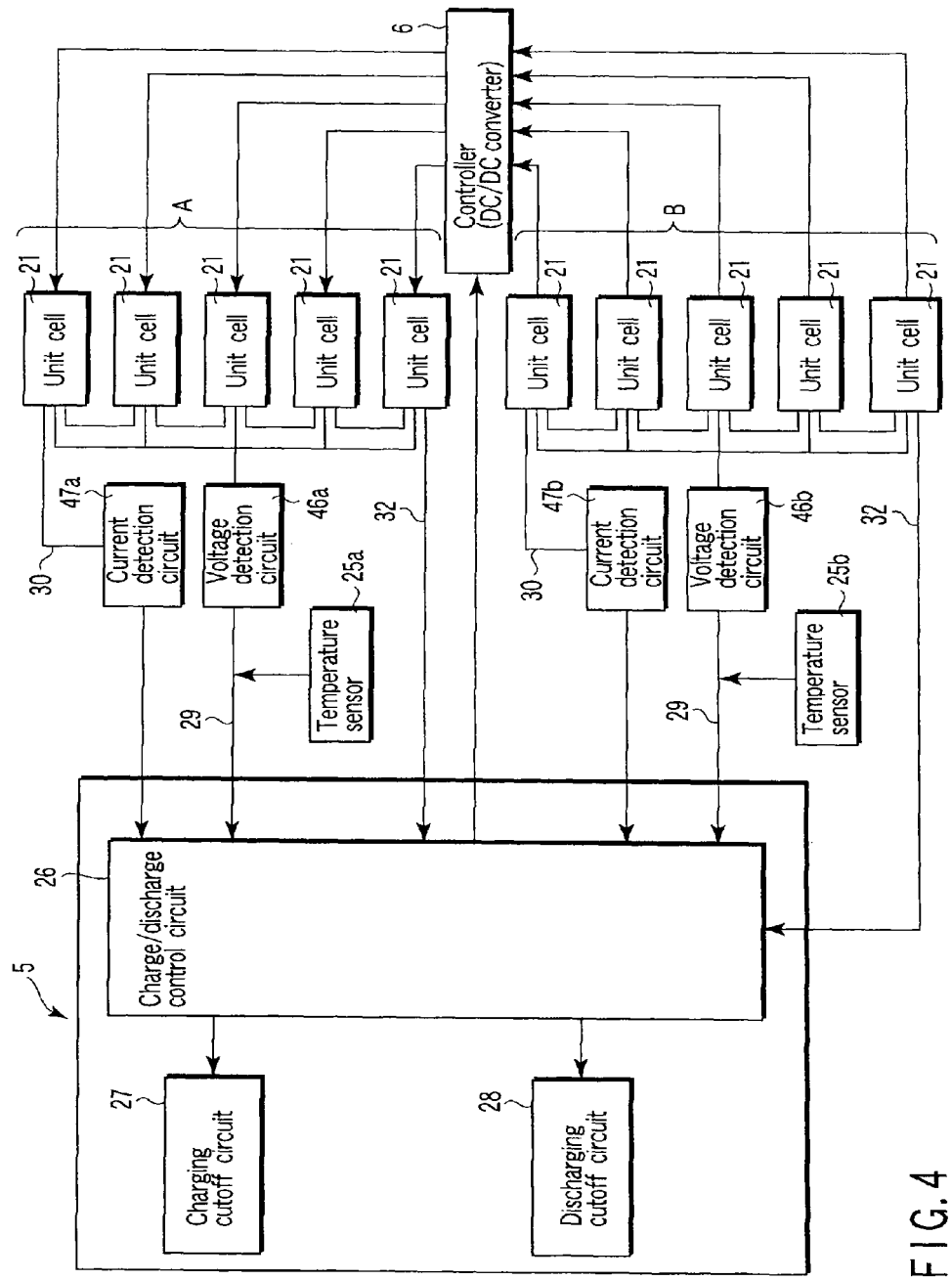
FIG. 4 is a block diagram showing a battery control unit in the power supply system of FIG. 1.

As shown in FIGS. 2 and 4, the plurality of unit cells 21 are laminated in a thickness direction while connected in series. The obtained battery modules A and B are integrated by an adhesive tape 23.

A printed wiring board 24 is arranged on a side from which the positive electrode terminal 15 and the negative electrode terminal 16 project. The BMU 5 and temperature sensors 25a and 25b shown in FIG. 4 are mounted on the printed wiring board 24. The BMU 5 includes the charge/discharge control circuit 26, a charging cutoff circuit 27, and a discharging cutoff circuit 28. The battery modules A and B may each have the BMUS, but in the case of FIG. 4, the BMU 5 is common to the battery modules A and B.

A voltage detection circuit 46a, which serves as voltage detection means, is connected to each connecting point between the unit cells 21 so that the voltage of all the unit cells 21 contained in the battery module A can be measured. A voltage detection circuit 46b, which serves as voltage detection means, is connected to each connecting point between the unit cells 21 so that the voltage of all the unit cells 21 contained in the battery module B can be measured. However, if the battery modules A and B contain a parallel connection, it is sufficient to measure the voltage at one point for each group of parallel connection because each pair of the unit cells 21 in each parallel connection group has the same voltage. Detection signals from the voltage detection circuits 46a and 46b are sent to the charge/discharge control circuit 26 via a wire 29.

Current detection circuits 47a and 47b, which serve as current detection means, are each connected to a positive electrode wire 30 of the battery modules A and B to detect a current value before a detection result is sent to the charge/discharge control circuit 26. The current detection circuits 47a and 47b may each be connected to a negative electrode wire 32 of the battery modules A and B. A charging current and a discharging current of each of the first and second nonaqueous electrolyte batteries are detected by the current detection circuits 47a and 47b.

The battery modules A and B include temperature sensors 25a and 25b, respectively. The temperature sensors 25a and 25b measure the temperature of all the unit cells 21 in the battery modules A and B, respectively. Incidentally, the temperature sensors 25a and 25b may be arranged to measure any unit cell among a plurality of unit cells 21. If the temperature of a part of the unit cells 21 is measured, the temperature of the unit cell 21 positioned in a center stage of the battery modules A and B is preferably measured. The highest temperatures detected by the temperature sensors 25a and 25b are assumed to be the temperatures of the battery modules A and B, respectively. In addition, a flat center portion of the unit cell 21 is preferably measured. Measurement results of the temperature sensors 25a and 25b are sent as detection signals to the charge/discharge control circuit 26 via the wire 29.

When information about a voltage, current, and temperature of the battery modules A and B is input, the charge/discharge control circuit 26 calculates a current charging depth of the battery modules A and B based on the input signal and compares the calculated charging depth with the target charging depth of the battery modules A and B. If the difference between the current charging depth and the target charging depth is large, the charge/discharge control circuit 26 sends to a signal to the controller 6, motor 7, or generator 8 and then the battery modules A and B are charged or discharged. Also, by sending a signal from the charge/discharge control circuit 26 to the charging cutoff circuit 27 or the discharging cutoff circuit 28, charging or discharging of the battery modules A and B is stopped. In this way, charging/discharging of the battery modules A and B is controlled.

The charge/discharge control circuit 26 sends a signal to the charging cutoff circuit 27 or the discharging cutoff circuit 28 not only when the charging depth of the battery modules A and B is controlled, but also when a predetermined condition is met. The predetermined condition includes, for example, when the temperature detected by the temperature sensors 25a and 25b is equal to or higher than a predetermined temperature, and when an overcharge, overdischarge, or overcurrent of the unit cell 21 is detected. The unit cell 21 is detected individually or all the unit cells 21 are detected as a whole. When the unit cell 21 is detected individually, the battery voltage may be detected or the positive electrode potential or negative electrode potential may be detected. In the latter case, a lithium electrode to be used as a reference electrode is inserted into each of the unit cells 21.

As shown in FIGS. 2 and 4, the positive electrode wire 30 of the battery modules A and B is electrically connected to a positive electrode connector 31 of the charge/discharge control circuit 26 of the printed wiring board 24. The negative electrode wire 32 of the battery modules A and B is electrically connected to a negative electrode connector 33 of the charge/discharge control circuit 26 of the printed wiring board 24.

Rubber or resin protective sheets 34 are arranged on three sides of each of the battery modules A and B other than a side where the positive electrode terminal 15 and the negative electrode terminal 16 project. A rubber or resin block-like protective block 35 is arranged between the side from which the positive electrode terminal 15 and the negative electrode terminal 16 project and the printed wiring board 24.

Each of the battery modules A and B is housed in a housing container 36 together with the protective sheets 34, the protective block 35, and the printed wiring board 24. That is, the protective sheets 34 are arranged on both internal surfaces in a long-side direction of the housing container 36 and on one internal surface in a short-side direction, and the printed wiring board 24 is arranged on the opposite internal surface in the short-side direction. Each of the battery modules A and B is positioned in a space surrounded by the protective sheets 34 and the printed wiring board 24. A cover 37 is mounted on an upper surface of the housing container 36.

A thermal contraction tape may be used, instead of the adhesive tape 23, for securing the battery modules A and B. In this case, protective sheets are arranged on both sides of the battery modules and a thermal contraction tube is circled, and then the thermal contraction tube is thermally contracted to tie the battery modules.

Although the unit cells 21 shown in FIGS. 2 and 4 are connected in series, they may be connected in parallel to increase battery capacity. Naturally, assembled battery modules may also be connected in series or in parallel.

Operations of the hybrid vehicle 2 provided with the power supply system 1 described above will be described below.

Electric energy of the battery module A is supplied to the motor 7 of the hybrid vehicle 2 through the booster 4. When the charging depth of the battery module A drops below a preset value, the charge/discharge control circuit 26 of the BMU 5 sends a signal to the discharging cutoff circuit 28 to suspend discharging of the battery module A. When power output from the battery module A stops, driving is switched to running by the engine 10.

As has been described, the battery module A is charged by the battery module B. When the hybrid vehicle 2 is running by driving of the motor 7, regenerative energy from the motor 7 when a brake is applied is supplied through the booster 4 to charge the battery module B. When the hybrid vehicle 2 is driven by the engine 10, regenerative energy from the engine 10 when a brake is applied is supplied to the battery module B through the generator 8 and the booster 4. When the charging depth of the battery module B reaches the preset value, the charge/discharge control circuit 26 of the BMU 5 sends a signal to the charging cutoff circuit 27 to suspend charging of the battery module B.

According to the hybrid vehicle 2 as described above, efficiency of regenerative charging can be enhanced by charging the battery module B with regenerative energy from the motor 7 or the engine 10 and at the same time, the power supply system can be discharged for a prolonged period by supplying electric energy from the battery module A to the motor 7.

Although no cooling fan is incorporated into the power supply system shown in FIG. 1, battery modules can also be cooled by incorporating a cooling fan. Also, an AC motor instead of a DC motor can be used. In this case, however, a rectifier is needed.

Figure 5:
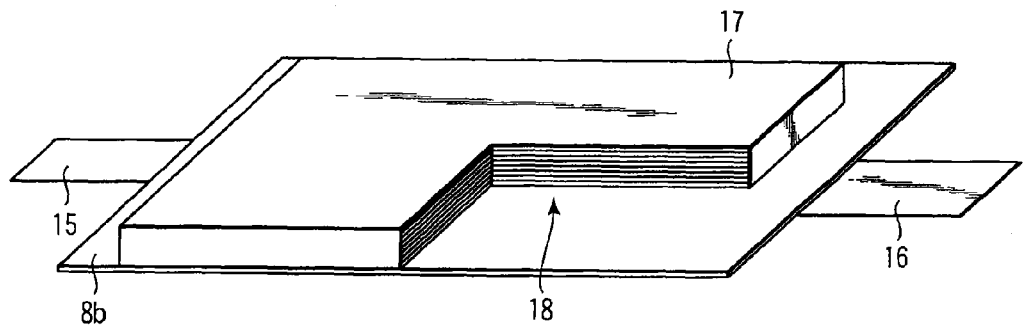
FIG. 5 is a partially cut-away perspective view schematically showing another flat nonaqueous electrolyte battery used in the battery module of FIG. 2.
Figure 6:
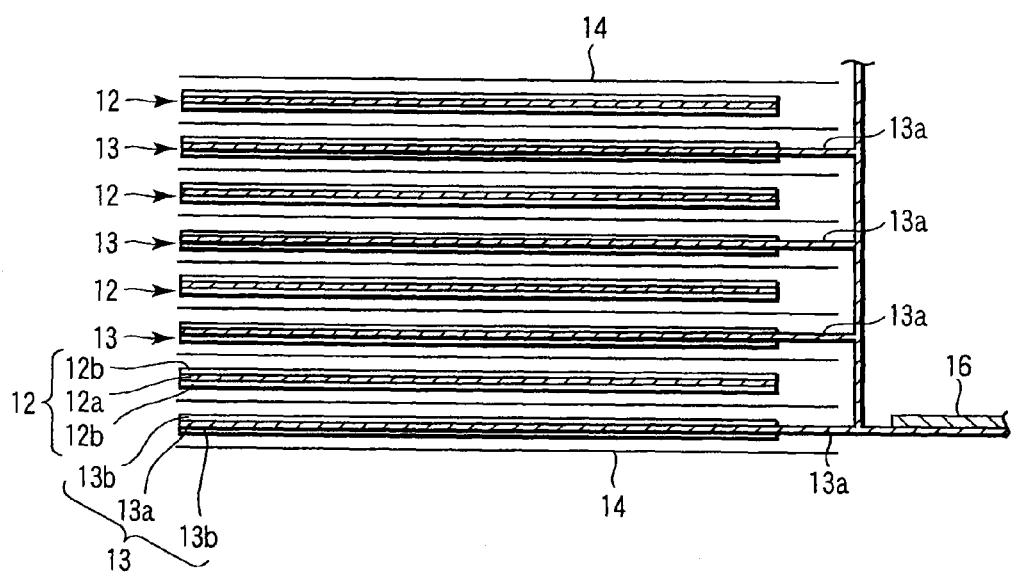
FIG. 6 is an enlarged sectional view of principal parts of an electrode group and a negative electrode terminal of FIG. 5.

Flat nonaqueous electrolyte batteries used for the battery modules A and B are not limited to the ones having the structure shown in FIG. 3 and, for example, the structure shown in FIGS. 5 and 6 may be adopted.

As shown in FIG. 5, a laminated electrode group 18 is housed inside the laminate film container 17. The laminated electrode group 18 has, as shown in FIG. 6, a structure in which the positive electrode 12 and the negative electrode 13 are laminated alternately with the separator 14 disposed therebetween. A plurality of the positive electrodes 12 are present and each one has a positive electrode current collector 12a and positive electrode active material-containing layers 12b held on both sides of the positive electrode current collector 12a. A plurality of the negative electrodes 13 are present and each one has a negative electrode current collector 13a and negative electrode active material-containing layers 13b held on both sides of the negative electrode current collector 13a. The negative electrode current collector 13a of each negative electrode 13 has one side projecting from the positive electrode 12. The negative electrode current collector 13a projecting from the positive electrode 12 is electrically connected to the band-like negative electrode terminal 16. A tip of the band-like negative electrode terminal 16 is pulled out of the container 17. Moreover, though not shown here, the side of the positive electrode current collector 12a of the positive electrode 12, opposite to the projecting side of the negative electrode current collector 13a, projects from the negative electrode 13. The positive electrode current collector 12a projecting from the negative electrode 13 is electrically connected to the band-like positive electrode terminal 15. A tip of the band-like positive electrode terminal 15 is on the opposite side of the negative electrode terminal 16 and pulled out of the container 17.

Second Embodiment

FIG. 7 shows a block diagram of a plug-in hybrid vehicle 41 in which the power supply system 1 according to the present embodiment is mounted. The plug-in hybrid vehicle 41 has the same structure as that of the first embodiment described above except that a charger 42 is provided. The charger 42 is connected to an external power supply 43 when the plug-in hybrid vehicle 41 is not running to charge the battery modules A and B. The charge/discharge control circuit 26 of the BMU 5 is also connected to the charger 42.

Electric energy of the battery module A is supplied to the motor 7 of the plug-in hybrid vehicle 41 through the booster 4. When the charging depth of the battery module A drops below a preset value, the charge/discharge control circuit 26 of the BMU 5 sends a signal to the discharging cutoff circuit 28 to suspend discharging of the battery module A. When power output from the battery module A stops, driving is switched to running by the engine 10.

The battery module A is charged by the battery module B or the charger 42. When the plug-in hybrid vehicle 41 is running by driving of the motor 7, braking energy from the motor 7 when a brake is applied is supplied through the booster 4 to charge the battery module B. When the plug-in hybrid vehicle 41 is driven by the engine 10, braking energy from the engine 10 when a brake is applied is supplied to the battery module B through the generator 8 and the booster 4. When the plug-in hybrid vehicle 41 is not running, the battery module B is charged by the charger 42. When the charging depth of the battery module B reaches the preset value, the charge/discharge control circuit 26 of the BMU 5 sends a signal to the charging cutoff circuit 27 to suspend charging of the battery module B.

According to the plug-in hybrid vehicle 41 as described above, efficiency of regenerative charging can be enhanced by charging the battery module B with regenerative energy from the motor 7 or the engine 10 and at the same time, the power supply system can be discharged for a prolonged period by supplying electric energy from the battery module A to the motor 7.

Third Embodiment

FIG. 8 shows a block diagram of an electric vehicle 44 in which the power supply system 1 according to the present embodiment is mounted. The electric vehicle 44 has the same structure as that of the first embodiment described above except that the engine 10 and the generator 8 are not mounted and the charger 42 is provided. The charger 42 is connected to an external power supply 43 when the electric vehicle 44 is not running to charge the battery modules A and B. The charge/discharge control circuit 26 of the BMU 5 is also connected to the charger 42.

Electric energy of the battery module A is supplied to the motor 7 of the electric vehicle 44 through the booster 4. When the charging depth of the battery module A drops below a preset value, the charge/discharge control circuit 26 of the BMU 5 sends a signal to the discharging cutoff circuit 28 to suspend discharging of the battery module A.

The battery module A is charged by the battery module B or the charger 42. When the electric vehicle 44 is running by driving of the motor 7, braking energy from the motor 7 when a brake is applied is supplied through the booster 4 to charge the battery module B. When the electric vehicle 44 is not running, the battery module B is charged by the charger 42. When the charging depth of the battery module B reaches the preset value, the charge/discharge control circuit 26 of the BMU 5 sends a signal to the charging cutoff circuit 27 to suspend charging of the battery module B.

According to the electric vehicle 44 as described above, efficiency of regenerative charging can be enhanced by charging the battery module B with regenerative energy from the motor 7 and at the same time, the power supply system can be discharged for a prolonged period by supplying electric energy from the battery module A to the motor 7.

Examples of the present invention will be described in detail below with reference to the drawings described above. It is to be noted that the present invention is not limited to Examples described below as long as they do not depart from the scope of the invention.

Example 1

A method of manufacturing a negative electrode of the second nonaqueous electrolyte battery will be described.

Slurry was prepared by compounding lithium titanate ($Li_4Ti_5O_{12}$) powder whose average particle diameter is 0.3 µm, whose lithium ion absorbing potential is 1.55V (vs. $Li/Li^+$), and having a spinel structure as an active material, carbon powder whose average particle diameter is 0.4 µm as a conductive agent, and polyvinylidene fluoride (PVdF) as a binder in a weight ratio of 90:7:3, and then dispersing the composition in an n-methylpyrrolidone (NMP) solvent. Aluminum alloy foil (purity: 99.4%) having a thickness of 12 µm and an average crystal grain size of 50 µm was coated with the obtained slurry and then the aluminum alloy foil was dried and pressed to manufacture a negative electrode having the electrode density of 2.4 g/cm³.

The lithium ion absorbing potential was measured by a method described below.

The negative electrode was cut into a small piece sized at 1 cm×1 cm to obtain a working electrode. The working electrode was arranged to face a counter electrode formed of a lithium metal foil sized at 2 cm×2 cm with a glass filter separator interposed therebetween, and a lithium metal used as a reference electrode was inserted so as not to be brought into contact with any of the working electrode and the counter electrode. These electrodes were put in a glass cell of a three pole type such that each of the working electrode, the counter electrode and the reference electrode was connected to the terminal of the glass cell. Under the particular condition, 50 mL of an electrolysis solution, which was prepared by dissolving $LiBF_4$ in a concentration of 2 mol/L in a mixed solvent prepared by mixing ethylene carbonate (EC) and γ-butyrolactone (GBL) in a mixing ratio by volume of 25:75, was poured into the glass cell such that the separator and the electrodes were sufficiently impregnated with the electrolysis solution, followed by hermetically closing the glass cell. The glass cell thus manufactured was arranged in a constant temperature bath maintained at 25° C. to measure the lithium ion absorbing potential of the working electrode at the time when the glass cell was charged with a current density of 0.1 mA/cm².

A method of manufacturing a positive electrode will be described.

Slurry was prepared by compounding lithium-cobalt-nickel-manganese oxide ($LiCo_{1/3}Ni_{1/3}Mn_{1/3}O_2$) whose average particle diameter is 3.3 µm as an active material, graphite powder as a conductive agent, and polyvinylidene fluoride (PVdF) as a binder in a weight ratio of 87:8:5, and then dispersing the composition in an n-methylpyrrolidone (NMP) solvent. Aluminum foil (purity: 99.99%) having a thickness of 15 µm and an average crystal grain size of 12 µm was coated with the obtained slurry and then the aluminum foil was dried and pressed to manufacture a positive electrode having the electrode density of 3.0 g/cm³.

An aluminum-containing laminate film having a thickness of 0.1 mm was used as a container. An aluminum layer of the aluminum-containing laminate film had a thickness of about 0.03 mm and an average crystal grain size of about 100 µm. Polypropylene was used as a resin for reinforcing the aluminum layer. The container was finished by heat-sealing laminate films.

Next, a band-like positive electrode terminal was electrically connected to the positive electrode and a band-like negative electrode terminal was electrically connected to the negative electrode. A separator made of a polyethylene porous film having a thickness of 12 µm was brought into close contact with the positive electrode, which was then covered with the separator. The negative electrode was stacked on the positive electrode covered with the separator, and the resultant structure was wound in a spiral form to manufacture an electrode group. The electrode group was pressed into a flat shape. The electrode group formed into a flat shape was inserted into the container.

1.5 mol/L of lithium salt $LiBF_4$ was dissolved in an organic solvent in which EC and GBL were mixed in a volume ratio (EC:GBL) of 1:2 to prepare a liquid nonaqueous electrolyte. The obtained nonaqueous electrolyte was poured into the container to manufacture a second nonaqueous electrolyte battery having the structure shown in FIG. 3 with a thickness of 6.5 mm, width of 70 mm, and height of 100 mm. The battery had a weight of 90 g and nominal capacity of 3000 mAh.

Six units of the second nonaqueous electrolyte battery were connected in series and then fixed to a plastic plate to make a module. Twenty units of the module were connected in series to make a battery module B (rated voltage: 264V, rated capacity: 3 Ah) of the power supply system.

Next, a method of manufacturing a negative electrode of the first nonaqueous electrolyte battery will be described.

Slurry was prepared by compounding natural graphite whose $d_{002}$ is 0.3356 nm and whose average particle diameter is 10 µm as an active material and polyvinylidene fluoride (PVdF) as a binder in a weight ratio of 95:5, and then dispersing the composition in an n-methylpyrrolidone (NMP) solvent. Copper foil (purity: 99.9%) having a thickness of 12 µm was coated with the obtained slurry and then the copper foil was dried and pressed to manufacture a negative electrode having the electrode density of 1.3 g/cm³. The thickness of the negative electrode layer of one side was 150 µm.

Average layer spacing derived from (002) reflection $d_{002}$ of a carbonaceous material was determined from a powder X-ray diffraction spectrum by the FWHM (full width at half-maximum) middle point method. In this case, no correction of the scattering such as the Lorentz scattering was made.

A method of manufacturing a positive electrode will be described.

Slurry was prepared by compounding lithium-cobalt oxide ($LiCoO_2$) whose average particle diameter is 3 µm as an active material, graphite powder as a conductive agent, and polyvinylidene fluoride (PVdF) as a binder in a weight ratio of 87:8:5, and then dispersing the composition in an n-methylpyrrolidone (NMP) solvent. Aluminum foil (purity:

99.99%) having a thickness of 15 μm and an average crystal grain size of 12 μm was coated with the obtained slurry and then the aluminum foil was dried and pressed to manufacture a positive electrode having the electrode density of 3.5 g/cm³.

An aluminum-containing laminate film having a thickness of 0.1 mm was used as a container. An aluminum layer of the aluminum-containing laminate film had a thickness of about 0.03 mm and an average crystal grain size of about 100 μm. Polypropylene was used as a resin for reinforcing the aluminum layer. The container was finished by heat-sealing laminate films.

Next, a band-like positive electrode terminal was electrically connected to the positive electrode and a band-like negative electrode terminal was electrically connected to the negative electrode. A separator made of a polyethylene porous film having a thickness of 12 μm was brought into close contact with the positive electrode, which was then covered with the separator. The negative electrode was stacked on the positive electrode covered with the separator, and the resultant structure was wound in a spiral form to manufacture an electrode group. The electrode group was pressed into a flat shape. The electrode group formed into a flat shape was inserted into the container.

1.5 mol/L of lithium salt $LiBF_6$ was dissolved in an organic solvent in which EC and DEC were mixed in a volume ratio (EC:DEC) of 1:3 to prepare a liquid nonaqueous electrolyte. The obtained nonaqueous electrolyte was poured into the container to manufacture a first nonaqueous electrolyte battery having the structure shown in FIG. 3 with a thickness of 13 mm, width of 70 mm, and height of 150 mm. The battery had a weight of 400 g and nominal capacity of 12 Ah.

Three units of the first nonaqueous electrolyte battery were connected in series and then fixed to a plastic plate to make a module. Twenty units of the module were connected in series to make a battery module A (rated voltage: 210V, rated capacity: 20 Ah) of the power supply system.

Using the battery module A, the battery module B, a battery management unit (BMU) and a booster, the above power supply system shown in FIG. 8 was manufactured.

The obtained power supply system was mounted in an electric vehicle in the temperature environment of 45° C. and the charging depth (SOC) of the battery module A was set to 20% and that of the battery module B to 40%. While fast charging of the battery module B was performed for 1 minute with regenerative energy of the motor at 100 A and 280V (28 kW), the battery module A was charged with a constant current of 50 A and maximum voltage of 250V via a DC-DC converter until the value of SOC reached 60% so as to maintain the value of SOC of the battery module B at 40%. The charging current density of the second nonaqueous electrolyte battery was 1111 A/kg, and the charging current density of the first nonaqueous electrolyte battery is 125 A/kg. Then, the time for which the motor was driven corresponding to running at constant speed was measured. Incidentally, the motor was supplied with the current of 220V and 4 A (0.88 kW) from the battery module A during the operation. The obtained initial motor driving time is shown in Table 1 below. This series of operation was repeated 1000 times and then, the motor driving time after 1000 times was measured. The result is shown in Table 1 below.

Example 2

The initial motor driving time and the motor driving time after 1000 times were measured in the same manner as Example 1 described above except that SOC of the battery module B in the motor driving test was set to 20%. These results are shown in Table 1 below.

Example 3

The initial motor driving time and the motor driving time after 1000 times were measured in the same manner as Example 1 described above except that SOC of the battery module B in the motor driving test was set to 60%. These results are shown in Table 1 below.

Example 4

The initial motor driving time and the motor driving time after 1000 times were measured in the same manner as Example 1 described above except that SOC of the battery module B in the motor driving test was set to 80%. These results are shown in Table 1 below.

Example 5

The initial motor driving time and the motor driving time after 1000 times were measured by manufacturing a power supply system and an electric vehicle similar to those in Example 1 except that $LiCo_{0.97}Sn_{0.03}O_2$ whose average particle diameter is 3.0 μm was used as the positive electrode active material of the second nonaqueous electrolyte battery. These results are shown in Table 1 below.

Example 6

The initial motor driving time and the motor driving time after 1000 times were measured by manufacturing a power supply system and a motor car similar to those in Example 1 except that lithium-cobalt-nickel-manganese oxide ($LiCo_{1/3}Ni_{1/3}Mn_{1/3}O_2$) whose average particle diameter is 6 μm was used as the positive electrode active material of the second nonaqueous electrolyte battery. These results are shown in Table 1 below.

Example 7

The initial motor driving time and the motor driving time after 1000 times were measured by manufacturing a power supply system and a motor car similar to those in Example 1 except that $LiNi_{0.8}Co_{0.15}Al_{0.05}O_2$ whose average particle diameter is 5 μm was used as the positive electrode active material of the second nonaqueous electrolyte battery. These results are shown in Table 1 below.

Example 8

The initial motor driving time and the motor driving time after 1000 times were measured by manufacturing a power supply system and a motor car similar to those in Example 1 except that hard carbon ($d_{002}$ is 0.37 nm and the average particle diameter is 10 μm) was used as the negative electrode active material of the first nonaqueous electrolyte battery. These results are shown in Table 1 below.

Comparative Example 1

The initial motor driving time and the motor driving time after 1000 times were measured by manufacturing a power supply system and a motor car similar to those in Example 1 except that a power supply system 1 including the battery module A but not the battery module B as shown in FIG. 11 was manufactured. These results are shown in Table 1 below.

Comparative Example 2

The initial motor driving time and the motor driving time after 1000 times were measured by manufacturing a power supply system and a motor car similar to those in Example 1 except that $LiCoO_2$ whose average particle diameter is 1 μm was used as the positive electrode active material of the second nonaqueous electrolyte battery. These results are shown in Table 1 below.

Comparative Example 3

The initial motor driving time and the motor driving time after 1000 times were measured in the same manner as Example 1 described above except that SOC of the battery module B in the motor driving test was set to 90%. These results are shown in Table 1 below.

Comparative Example 4

The initial motor driving time and the motor driving time after 1000 times were measured in the same manner as Example 1 described above except that SOC of the battery module B in the motor driving test was set to 10%. These results are shown in Table 1 below.

Table 1 also shows the rate of maintenance of the motor driving time after 1000 times with respect to the initial motor driving time.

In contrast, in the power supply system of Comparative Example 1 that does not use the battery module B, that of Comparative Example 2 that uses $LiCoO_2$ as the positive electrode active material of the battery module B, and that of Comparative Example 4 that sets SOC of the battery module B to less than 20%, the rates of decrease in the motor driving time after repeating 1000 times were high, though the initial driving times were long. In the power supply system of Comparative Example 3 in which SOC of the battery module B exceeds 80%, the initial driving time was also shorter than those in Examples 1 to 8.

Also, comparison of Examples 1 to 4 shows that in Examples 1 and 3 in which SOC of the battery module B is set to 40% or more and 60% or less, the rate of maintenance of the motor driving time after repeating 1000 times with respect to the initial motor driving time is higher.

Figure 9:
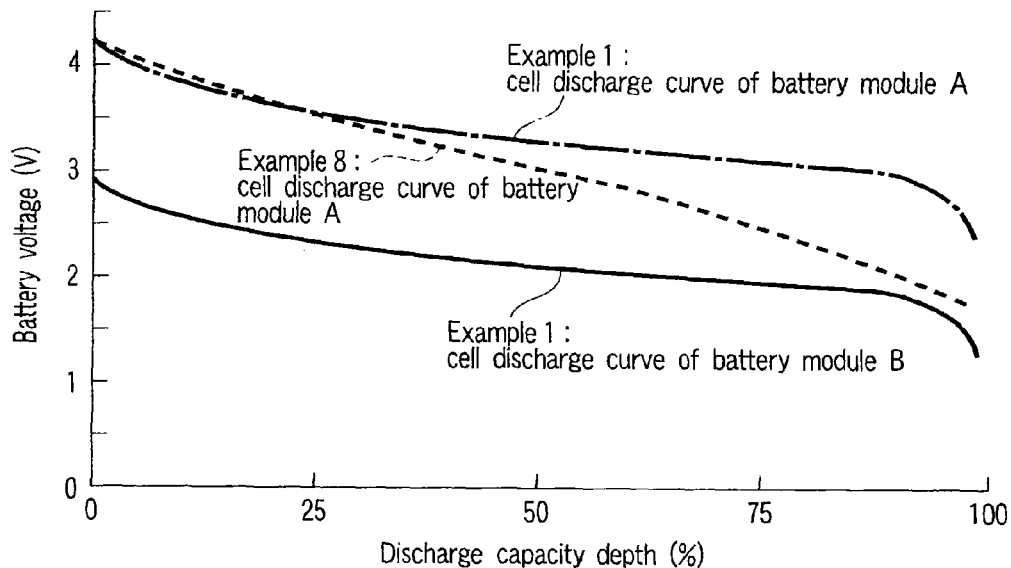
FIG. 9 is a chart showing discharge curves of a cell of a battery module A in Example 1, that of a battery module B in Example 1, and that of a battery module A in Example 8.

Discharge curves of the cell (first nonaqueous electrolyte battery) of the battery module A in Example 1, the cell (second nonaqueous electrolyte battery) of the battery module B in Example 1, and the cell (first nonaqueous electrolyte battery) of the battery module A in Example 8 were measured and FIG. 9 shows results of the measurement. The vertical axis in FIG. 9 denotes the cell voltage (V) and the horizontal axis denotes the discharge capacity depth (%) of the cell.

As is evident from FIG. 9, the cell discharge curve of the battery module A in Example 1 is similar to that of the battery module B in Example 1 in inclination and length of a flat voltage portion. This makes control of SOC of the battery modules A and B easier so that remaining capacities of the battery modules A and B can be detected accurately.

TABLE 1

| | Negative electrode active material of battery module A | Positive electrode active material of battery module B | | SOC of battery module B (%) | Initial motor driving time (min) | Motor driving time after repeating 1000 times (min) | Maintenance ratio of driving time (%) |
|---|---|---|---|---|---|---|---|
| | | Average particle diameter μm | Composition | | | | |
| Example 1 | Natural graphite | 3.3 | $LiCo_{1/3}Ni_{1/3}Mn_{1/3}O_2$ | 40 | 30 | 29 | 97 |
| Example 2 | Natural graphite | 3.3 | $LiCo_{1/3}Ni_{1/3}Mn_{1/3}O_2$ | 20 | 30 | 25 | 83 |
| Example 3 | Natural graphite | 3.3 | $LiCo_{1/3}Ni_{1/3}Mn_{1/3}O_2$ | 60 | 20 | 19 | 95 |
| Example 4 | Natural graphite | 3.3 | $LiCo_{1/3}Ni_{1/3}Mn_{1/3}O_2$ | 80 | 10 | 7 | 70 |
| Example 5 | Natural graphite | 3.0 | $LiCo_{0.97}Sn_{0.03}O_2$ | 40 | 30 | 28 | 96 |
| Example 6 | Natural graphite | 6 | $LiCo_{1/3}Ni_{1/3}Mn_{1/3}O_2$ | 40 | 30 | 25 | 83 |
| Example 7 | Natural graphite | 5 | $LiNi_{0.8}Co_{0.15}Al_{0.05}O_2$ | 40 | 30 | 24 | 80 |
| Example 8 | Hard carbon | 3.3 | $LiCo_{1/3}Ni_{1/3}Mn_{1/3}O_2$ | 40 | 20 | 19.6 | 98 |
| Example 9 | Natural oraphite | 3.3 | $LiNi_{0.5}Mn_{0.5}O_2$ | 40 | 30 | 28 | 93 |
| Example 10 | Natural graphite | 3.3 4 | $LiCo_{1/3}Ni_{1/3}Mn_{1/3}O_2$ and $LiMn_2O_4$ (1:1) | 40 | 32 | 29 | 91 |
| Example 11 | Natural graphite | 3.3 2 | $LiCo_{1/3}Ni_{1/3}Mn_{1/3}O_2$ and $LiFePO_4$(1:1) | 40 | 28 | 27 | 96 |
| Comparative Example 1 | Natural graphite | — | None | None | 30 | 2.0 | 6.7 |
| Comparative Example 2 | Natural graphite | 1 | $LiCoO_2$ | 40 | 30 | 5.0 | 17 |
| Comparative Example 3 | Natural graphite | 3.3 | $LiCo_{1/3}Ni_{1/3}Mn_{1/3}O_2$ | 90 | 5 | 1.0 | 20 |
| Comparative Example 4 | Natural graphite | 3.3 | $LiCo_{1/3}Ni_{1/3}Mn_{1/3}O_2$ | 10 | 30 | 15.0 | 50 |

Table 1 shows that the power supply systems of Examples 1 to 8 have high rates of maintenance of the motor driving time after repeating 1000 times with respect to the initial motor driving time and thus cause less cycle degradation in fast charging. This is because the power supply systems have superior input performance due to high fast charging performance of the battery module B and thus degrade only slightly during charging.

Moreover, overcharging and overdischarging of the cell can reliably be prevented by controlling SOC, leading to improved cycle performance. The cell discharge curve of the battery module A in Example 8 was low in voltage flatness compared with the cell discharge curve of the battery module B in Example 1.

Figure 10:
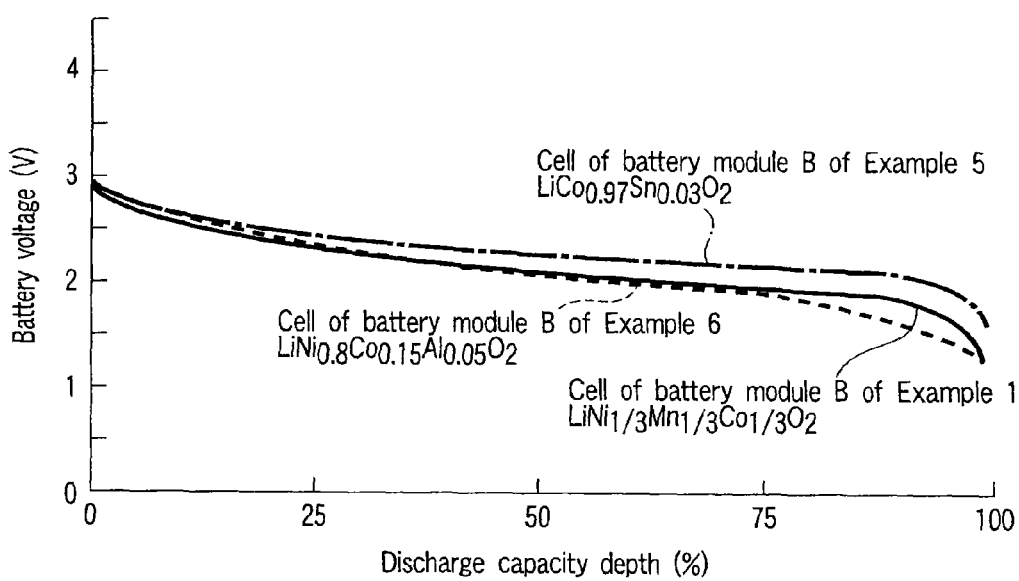
FIG. 10 is a chart showing discharge curves of cells of battery modules B in Examples 1, 5, and 6.

Further, discharge curves of the cells (second nonaqueous electrolyte batteries) of the battery module B in Examples 1, 5, and 6 were measured and FIG. 10 shows results of the measurement. The vertical axis in FIG. 10 denotes the cell voltage (V) and the horizontal axis denotes the discharge capacity depth (%) of the cell.

As is evident from FIG. 10, Examples 1 and 5 in which a positive electrode active material using at least one element selected from Ni, Mn, and Sn for the element M in $Li_xCo_yM_{1-y}O_2$ is used is superior in voltage flatness compared with Example 6 in which Al is used for the element M, making control of SOC of the battery module easier.

Example 9

The initial motor driving time and the motor driving time after 1000 times were measured by manufacturing a power supply system and a motor car similar to those in Example 1 except that $LiNi_{0.5}Mn_{0.5}O_2$ particle whose average particle diameter is 3.3 μm was used as the positive electrode active material of the second nonaqueous electrolyte battery. These results are shown in Table 1 below.

Example 10

The initial motor driving time and the motor driving time after 1000 times were measured by manufacturing a power supply system and a motor car similar to those in Example 1 except that a mixture consisting of 50% by weight lithium-cobalt-nickel-manganese oxide ($LiCo_{1/3}Ni_{1/3}Mn_{1/3}O_2$) particles whose average particle diameter is 3.3 μm and 50% by weight $LiMn_2O_4$ particles whose average particle diameter is 4 μm was used as the positive electrode active material of the second nonaqueous electrolyte battery. These results are shown in Table 1 below.

Example 11

The initial motor driving time and the motor driving time after 1000 times were measured by manufacturing a power supply system and a motor car similar to those in Example 1 except that a mixture consisting of 50% by weight lithium-cobalt-nickel-manganese oxide ($LiCo_{1/3}Ni_{1/3}Mn_{1/3}O_2$) particles whose average particle diameter is 3.3 μm and 50% by weight $LiFePO_4$ particles whose average particle diameter is 2 μm was used as the positive electrode active material of the second nonaqueous electrolyte battery. These results are shown in Table 1 below.

Figure 12:
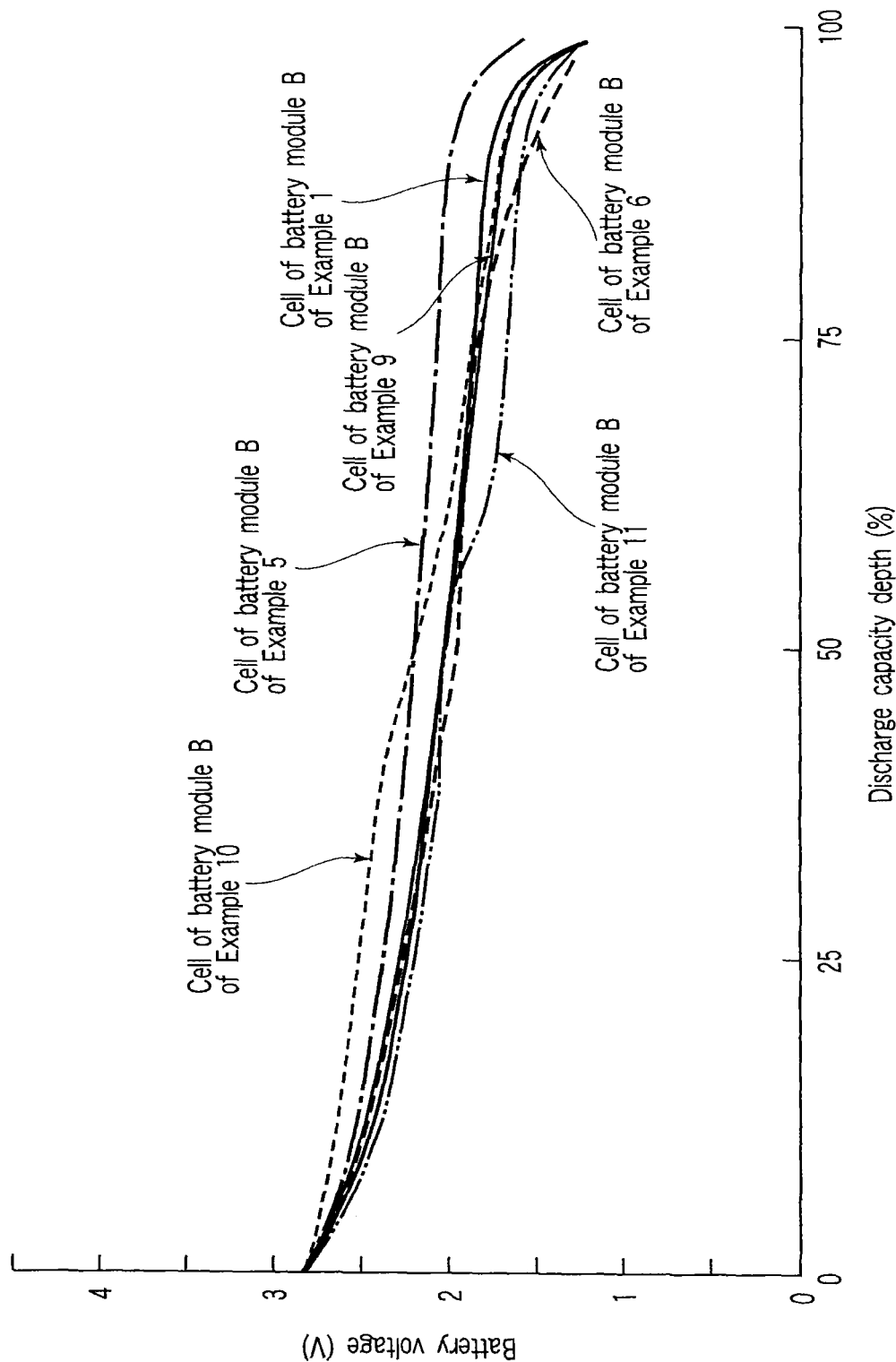
FIG. 12 is a chart showing discharge curves of cells of battery modules B in Examples 1, 5, 6, and 9 to 11.

Discharge curves of the cells of the battery module B in Examples 9 to 11 were measured and FIG. 12 shows results of the measurement. The vertical axis in FIG. 12 denotes the cell voltage (V) and the horizontal axis denotes the discharge capacity depth (%) of the cell.

As is evident from the results of Table 1, the power supply systems in Examples 9 to 11 have high rates of maintenance of the motor driving time after repeating 1000 times with respect to the initial motor driving time, which indicates that less cycle degradation is caused in fast charging. FIG. 12 shows that the cell discharge curve of the battery module B in Example 9 is similar to that of the battery module B in Example 1, confirming that control of SOC of the battery modules A and B is easy even when y in the composition expression of lithium metallic oxide is 0. FIG. 12 also shows that the cell voltage of the battery module B in Example 10 is higher than that of the battery module B in Example 1, and that a voltage drop occurs abruptly for the cell of the battery module B in Example 11 compared with that of the battery module B in Example 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A charging/discharging controlling method for a battery module system comprising:
    a first battery module which supplies electric energy to an outside and comprises a first nonaqueous electrolyte battery comprising a positive electrode and a negative electrode containing a carbonaceous material; and
    a second battery module which supplies electric energy to the first battery module and comprises a second nonaqueous electrolyte battery comprising a negative electrode containing a negative electrode active material that has a lithium ion absorbing potential of 0.4V vs. Li/Li+ or more and an average particle diameter of 1 μm or less, and a positive electrode containing lithium metallic oxide represented by $Li_xCo_yM_{1-y}O_2$, wherein M is at least one element selected from the group consisting of Ni, Mn, Al and Sn, $0<x\le1.1$, and $0\le y<1$,
    the method comprising:
    maintaining a value of a charging depth of the second battery module in a range of 20 to 80% by charging the second battery module at a second charging current density (A/kg) and charging the first battery module by the second battery module at a first charging current density (A/kg),
    wherein the second charging current density is higher than the first charging current density.

2. The method of claim 1, wherein the second battery module is charged by a regenerative energy of a hybrid vehicle at the second charging current density.

3. The method of claim 1, wherein the second battery module is charged by a regenerative energy of an electric vehicle at the second charging current density.

4. The method of claim 1, wherein the first battery module is charged by the second battery module at the first charging current density until a charging depth of the first battery module falls within a range of 40 to 100%.

5. The method of claim 1, wherein the charging depth of the second battery module is 60 to 80%.

6. The method of claim 1, wherein:
    the first battery module comprises a plurality of the first nonaqueous electrolyte batteries, and the first nonaqueous electrolyte batteries are connected in series or in parallel, and
    the second battery module comprises a plurality of the second nonaqueous electrolyte batteries, and the second nonaqueous electrolyte batteries are connected in series or in parallel.

7. The method of claim 1, wherein the battery module system further comprises a charge/discharge control circuit common to the first nonaqueous electrolyte battery and the second nonaqueous electrolyte battery.

8. The method of claim 1, wherein y has a value satisfying $0<y<1$.

9. The method of claim 1, wherein in the first nonaqueous electrolyte battery, the carbonaceous material is a graphitized material whose average layer spacing derived from (002) reflection $d_{002}$ is 0.337 nm or less, and the positive electrode includes the lithium metallic oxide.

10. The method of claim 1, wherein the lithium metallic oxide is represented by $Li_xCo_yNi_zMn_{1-y-z}O_2$, where $0<x\le1.1$, $0.1\le y\le0.6$, and $0.1\le z\le0.8$.

11. The method of claim 1, wherein in the second nonaqueous electrolyte battery, the negative electrode active material is a lithium-titanium oxide having a spinel structure.

12. The method of claim 1, wherein the positive electrode of the second nonaqueous electrolyte battery includes a second lithium metallic oxide being at least one selected from the group consisting of a lithium-manganese complex oxide having a spinel structure, a lithium-manganese-nickel complex oxide having a spinel structure and a lithium metal phosphate having an olivine structure.

13. The method of claim 1, wherein:
in the first nonaqueous electrolyte battery, the carbonaceous material is a graphitized material whose average layer spacing derived from (002) reflection $d_{002}$ is 0.337 nm or less, and the positive electrode includes the lithium metallic oxide, and
in the second nonaqueous electrolyte battery, the negative electrode active material is a lithium-titanium oxide having a spinel structure.

* * * * *